(12) United States Patent
Brown, Jr. et al.

(10) Patent No.: US 12,221,229 B2
(45) Date of Patent: Feb. 11, 2025

(54) SYSTEM AND METHOD FOR MEASURING LOCALIZED CHARACTERISTICS OF A TRANSPARENCY

(71) Applicant: The Boeing Company, Chicago, IL (US)

(72) Inventors: James W. Brown, Jr., Wentzville, MO (US); John Joseph Haake, St. Charles, MO (US); Xue Liu, Maryland Heights, MO (US); Anthony Carl Roberts, St. Paul, MO (US); Nathaniel Philip Roman, Ballwin, MO (US); Matthew Mark Thomas, Maryland Heights, MO (US); Lucian Woods, Florissant, MO (US)

(73) Assignee: The Boenig Company, Arlington, VA (US)

( * ) Notice: Subject to any disclaimer, the term of this patent is extended or adjusted under 35 U.S.C. 154(b) by 677 days.

(21) Appl. No.: 16/672,363

(22) Filed: Nov. 1, 2019

(65) Prior Publication Data
US 2021/0129971 A1  May 6, 2021

(51) Int. Cl.
*G06T 7/00* (2017.01)
*B25J 19/02* (2006.01)
*B64F 5/60* (2017.01)
*G01N 21/958* (2006.01)

(52) U.S. Cl.
CPC .............. *B64F 5/60* (2017.01); *B25J 19/021* (2013.01); *G01N 21/958* (2013.01); *G06T 7/0004* (2013.01)

(58) Field of Classification Search
None
See application file for complete search history.

(56) References Cited

U.S. PATENT DOCUMENTS

| | | |
|---|---|---|
| 4,461,570 A | 7/1984 | Task |
| 5,343,288 A | 8/1994 | Cohen |
| 5,479,276 A | 12/1995 | Herbermann |
| 6,001,486 A | 12/1999 | Varaprasad |
| 6,208,412 B1 | 3/2001 | Ladewski |
| 6,882,411 B2 | 4/2005 | Dispenza |

(Continued)

FOREIGN PATENT DOCUMENTS

| | | | | |
|---|---|---|---|---|
| GB | 2454574 A | * | 5/2009 | ............. G06T 7/001 |
| JP | 2017009383 A | * | 1/2017 | |

OTHER PUBLICATIONS

Maniatis, Christos, et al. "Best viewpoint tracking for camera mounted on robotic arm with dynamic obstacles." 2017 International Conference on 3D Vision (3DV). IEEE, 2017. (Year: 2017).*

(Continued)

*Primary Examiner* — Sean M Conner

(57) ABSTRACT

A system includes a robotic arm of a robotic device, an imaging device coupled to the robotic arm, and a processor configured to control movement of the robotic arm to move the imaging device along a preprogrammed measurement path of a transparency while prompting the imaging device to record images of localized portions of the transparency. The processor is configured to determine one or more localized transparency characteristics based on an analysis of the images of the localized portions.

20 Claims, 16 Drawing Sheets

---

500

502 — CONTROLLING MOVEMENT OF A ROBOTIC ARM TO MOVE AN IMAGING DEVICE ALONG A PREPROGRAMMED MEASUREMENT PATH OF A TRANSPARENCY, THE IMAGING DEVICE COUPLED TO THE ROBOTIC ARM

504 — RECORDING, USING THE IMAGING DEVICE, IMAGES OF LOCALIZED PORTIONS OF THE TRANSPARENCY WHILE MOVING THE IMAGING DEVICE ALONG THE PREPROGRAMMED MEASUREMENT PATH

506 — DETERMINING, VIA A PROCESSOR, ONE OR MORE LOCALIZED TRANSPARENCY CHARACTERISTICS BASED ON AN ANALYSIS OF THE IMAGES OF THE LOCALIZED PORTIONS

(56) References Cited

U.S. PATENT DOCUMENTS

| | | | |
|---|---|---|---|
| 7,365,838 B2 | 4/2008 | Jones | |
| 7,899,236 B2 | 3/2011 | Freeman | |
| 8,358,830 B2* | 1/2013 | Bookout | G06F 18/00 |
| | | | 382/141 |
| 8,614,559 B2 | 12/2013 | Kassow et al. | |
| 8,644,587 B2 | 2/2014 | Bookout | |
| 8,917,312 B1 | 12/2014 | Gleason et al. | |
| 9,291,657 B2 | 3/2016 | Zaostrovnykh et al. | |
| 9,459,299 B2 | 10/2016 | Maloney et al. | |
| 9,995,694 B2 | 6/2018 | Schultz et al. | |
| 10,048,301 B2 | 8/2018 | Maloney et al. | |
| 10,203,202 B2 | 2/2019 | Schultz et al. | |
| 10,753,882 B1* | 8/2020 | Mahajan | G06T 7/0004 |
| 2006/0092276 A1 | 5/2006 | Ariglio | |
| 2009/0251917 A1 | 10/2009 | Wollner | |
| 2011/0235894 A1* | 9/2011 | Bookout | G06T 7/0004 |
| | | | 382/141 |
| 2015/0077742 A1* | 3/2015 | Wootton | G01N 21/8806 |
| | | | 356/239.3 |
| 2015/0308943 A1* | 10/2015 | Vild | G01N 21/896 |
| | | | 356/244 |
| 2015/0348253 A1* | 12/2015 | Bendall | H04N 7/183 |
| | | | 348/86 |
| 2016/0379376 A1* | 12/2016 | Milne | G06T 7/246 |
| 2017/0059307 A1* | 3/2017 | Wieneke | G06T 7/521 |
| 2018/0357759 A1* | 12/2018 | Zonfrilli | G06T 7/0004 |
| 2019/0096057 A1* | 3/2019 | Allen | G01N 21/8851 |
| 2019/0287237 A1* | 9/2019 | de Bonfim Gripp | G06V 10/82 |
| 2020/0166467 A1* | 5/2020 | Bian | G01N 21/9515 |
| 2020/0175670 A1* | 6/2020 | Bolton | H04N 5/2256 |
| 2021/0164864 A1* | 6/2021 | Lemaire | G01M 11/0278 |
| 2021/0266461 A1* | 8/2021 | Koo | G06T 7/0004 |
| 2022/0057336 A1* | 2/2022 | Pearson | H04N 9/0451 |
| 2022/0222855 A1* | 7/2022 | Valtonen | H04N 25/61 |

OTHER PUBLICATIONS

Tantau, H.-J., et al. "Solar transmittance of greenhouse covering materials." VII International Symposium on Light in Horticultural Systems 956. 2012. (Year: 2012).*

Erdenedavaa, Purevdalai, et al. "Observation and modeling of dust deposition on glass tube of evacuated solar thermal collectors in Mongolia." Renewable energy 130 (2019): 613-621. (Year: 2019).*

Aerotech News, "Air Force teams with industry to further aircraft and radome coating research," Sep. 29, 2017.

Compass Technology Group, "Spot_Probes data sheet," retrieved Jul. 23, 2019.

Compass Technology Group, "Table-Top Free-Space Measurement System," retrieved Sep. 24, 2019.

Schultz et al., "Microwave Material Measurements without Cables," Microwave Product Digest, Mar. 20, 2017.

Schultz et al. "A Comparison of Material Measurement Accuracy of RF Spot Probes to a Lens-Based Focused Beam System," Proceedings of the 2014 AMTA, Tucson AZ, Nov. 2014.

Schultz et al. "Ruggedized Compact Microwave Probes for Mapping Material Properties of Structures," 14th International Symposium on Nondestructive Characterization of Materials (NDCM 2015), Jun. 22-26, 2015, Marina Del Rey, California, USA.

Wikipedia, "Coaxial Cable," retrieved Sep. 28, 2019.

Universal Robots, "Data Sheet—e-Series from Universal Robots," retrieved Jul. 23, 2019.

* cited by examiner

SYSTEM AND METHOD FOR MEASURING LOCALIZED CHARACTERISTICS OF A TRANSPARENCY

FIELD

The present disclosure relates generally to inspection systems and, more particularly, to a system and method for measuring localized characteristics of a transparency.

BACKGROUND

Transparencies are used in a wide variety of applications including aerospace applications such as air and space vehicles. For example, an aircraft cockpit typically includes a windshield and/or a canopy. Transparencies such as windshields may be formed of glass, polymeric materials, or as laminated combinations of glass and polymeric materials which may include, without limitation, acrylic and polycarbonate compositions. Transparencies may include one or more coatings such as transparent metalized coatings and/or conductive coatings.

During the production of aircraft, it is typically necessary to determine the localized properties or characteristics of certain transparencies to determine if the transparency meets design requirements. One characteristic that may be measured is the existence of optical defects such as carbon particulates in the transparency and which may appear as relatively small black spots embedded within the transparency. Other types of optical defects for which the transparency may be inspected include moisture, cracks, runs, or sags in the transparency, and scratches in the transparency surfaces. Another characteristic that may be measured is the transmission loss in electromagnetic radiation that impinges on the transparency. Transmission losses may be due to the absorption and/or reflection of electromagnetic radiation by the transparency and/or by one or more coatings on or in the transparency.

Known methods for inspecting transparencies for optical defects such as particulates, runs, and sags include high-speed inspection techniques used on automotive production lines wherein the size of allowable defects is typically larger than the allowable defect size (e.g., 0.030 inch) of aerospace transparencies. Furthermore, inspection methods used in the automotive industry are typically directed toward transparencies having relatively slight curvatures as compared to aircraft transparencies such as canopies and windshields which may be complexly curved at relatively smaller radii. In addition, the cross-sectional layup of an aircraft transparency such as an aircraft windshield is generally more complex than an automotive transparency due to the higher strength requirements and increased thickness (e.g., up to 1 inch thick or larger) of an aircraft windshield which may be necessary for surviving bird strikes and handling structural loads.

Known methods for measuring transmission losses of a transparency include a manual process that involves a mechanical caliper having a pair of arms that are hingedly coupled together at one end, and a measurement device mounted on an opposite end (e.g., the free end) of each arm. The caliper is manually held and manipulated in a manner to position the measurement devices on opposite sides of the transparency at each of a series of measurement locations while a signal is sent for measuring transmission losses. When manually moving the calipers, care must be taken to avoid contacting and potentially scratching the transparency with the measurement devices.

Unfortunately, the manually-operated caliper is a relatively heavy device which increases the risk of damage to the transparency if the measurement devices make contact with the transparency as the user manually moves the arms to position the measurement devices in free space at each measurement location. Furthermore, the discrete number of measurement locations limits the effectiveness of the inspection due to large regions of the transparency that are uninspected. Additionally, the method is limited to measuring transmission losses while the measurement devices are oriented generally perpendicular to the transparency surfaces, and does not allow for measuring transmission losses at non-perpendicular angles. In this regard, because the calipers are manually held in free space, the method is unable to measure transmission losses at a specific non-perpendicular angles.

SUMMARY

The above-noted needs associated with inspection of transparencies are specifically addressed by the present disclosure which provides an automated system for measuring localized characteristics of transparency. In one example, the system has a robotic arm of a robotic device, an imaging device coupled to the robotic arm, and a processor configured to control movement of the robotic arm to move the imaging device along a preprogrammed measurement path of a transparency while prompting the imaging device to record images of localized portions of the transparency. The processor is configured to determine one or more localized transparency characteristics based on an analysis of the images of the localized portions.

Also disclosed is a system comprising a fixture configured to support a transparency, a robotic arm of a robotic device mounted to the fixture, and a processor configured to control movement of the robotic arm. The robotic arm is configured to be coupled to an imaging device. The processor is configured to control movement of the robotic arm to move the imaging device along a preprogrammed measurement path of the transparency while prompting the imaging device to record images of localized portions of the transparency. The processor is configured to determine one or more localized transparency characteristics based on an analysis of the images of the localized portions.

In addition, disclosed is a method for inspecting a transparency. The method includes moving a first robotic arm and a second robotic arm in a coordinated manner to move a transmitting horn and a receiving horn along a preprogrammed measurement path of a transparency while maintaining the transmitting horn and the receiving horn in non-contacting proximity to the transparency. The transmitting horn is coupled to the first robotic arm. The receiving horn is coupled to the second robotic arm and is located on the same side of the transparency as the transmitting horn. The method also includes emitting, exclusively from the transmitting horn, an emitted signal for impingement on the transparency. In addition, the method includes receiving, exclusively at the receiving horn, a received signal comprising at least a portion of the emitted signal after impingement on the transparency. The method further includes analyzing, via a processor, the received signal and determining at least one transparency characteristic.

The features, functions and advantages that have been discussed can be achieved independently in various embodiments of the present disclosure or can be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein.

DETAILED DESCRIPTION

Figure 1:
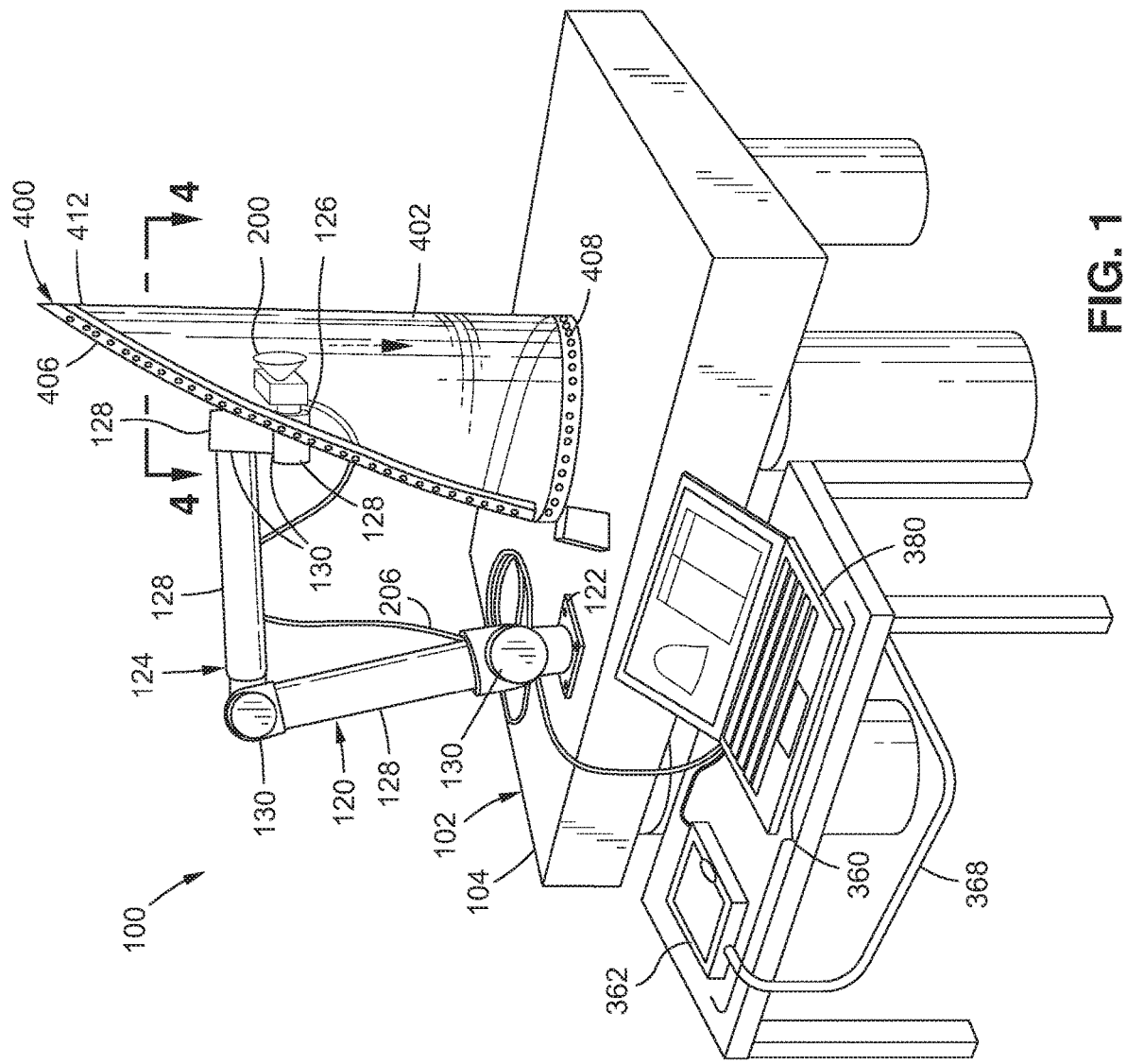
FIG. 1 is a perspective view of an example of a system for determining localized characteristics of a transparency which is shown supported on a fixture and further illustrating a robotic arm supporting an imaging device for recording images of localized portions of the transparency for analysis by a processor to determine the localized transparency characteristics.

Referring now to the drawings which illustrate various examples of the disclosure, shown in FIG. 1 is a perspective view of an example of a system 100 for automated determination of localized characteristics of a transparency 400. The system 100 includes a robotic arm 124 configured to move an imaging device 200 along a preprogrammed measurement path 330 (e.g., FIGS. 2-3) of the transparency 400 for recording images 454 (FIG. 6) of localized portions 452 (FIG. 6) of the transparency 400. The imaging device 200 can be provided in any one of a variety of configurations for recording images 454 of localized portions 452 containing any one of a variety of different types of optical defects 210 (FIG. 6) in a transparency 400. For example, the imaging device 200 can be configured as a visible-light camera 208 (e.g., FIG. 4) operating in the visible-light spectrum and configured to record images 454 of localized portions 452 for detecting particulates 212 (FIG. 6), runs (not shown), and/or sags (not shown) in a transparency 400, as described below. In another example, the imaging device 200 can be configured as an ultraviolet camera 214 (e.g., FIG. 4) operating in the ultraviolet spectrum and configured to record images 454 of localized portions 452 for detecting scratches 216 (FIG. 6), chips (not shown) and/or cracks (not shown) in a transparency surface 404, as described below. In still other examples, the imaging device 200 can be configured as a short wave infrared (SWIR) camera 218 (e.g., FIG. 4) operating in the short wave infrared spectrum and configured to record images 454 of localized portions 452 for detecting moisture (not shown) in the transparency 400, as described below. The system 100 additionally includes a processor 360 configured to analyze the images 454 of the localized portions 452, and determine localized transparency characteristics of the transparency 400 based on analysis of the images 454 of the localized portions 452.

Figure 3:
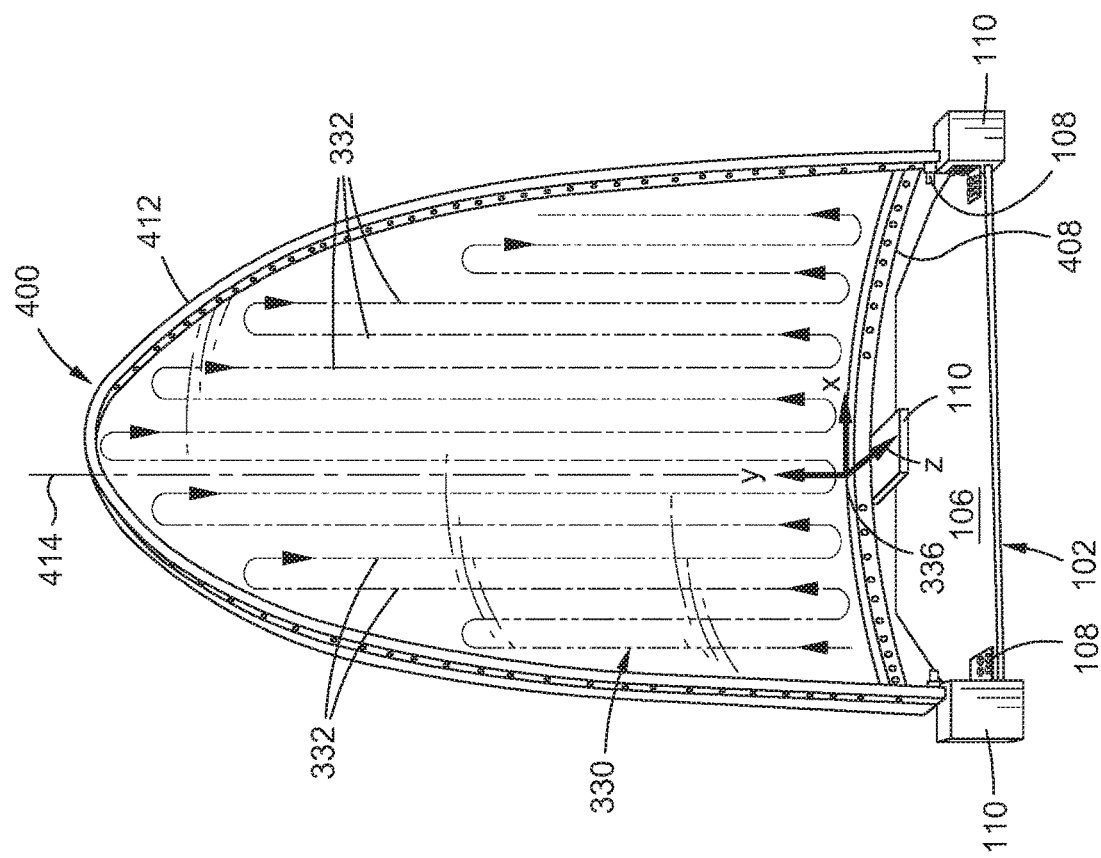
FIG. 3 is a front view of the transparency of FIG. 2 showing an example of a measurement path along which the imaging device can be moved by the robotic arm.
Figure 2:
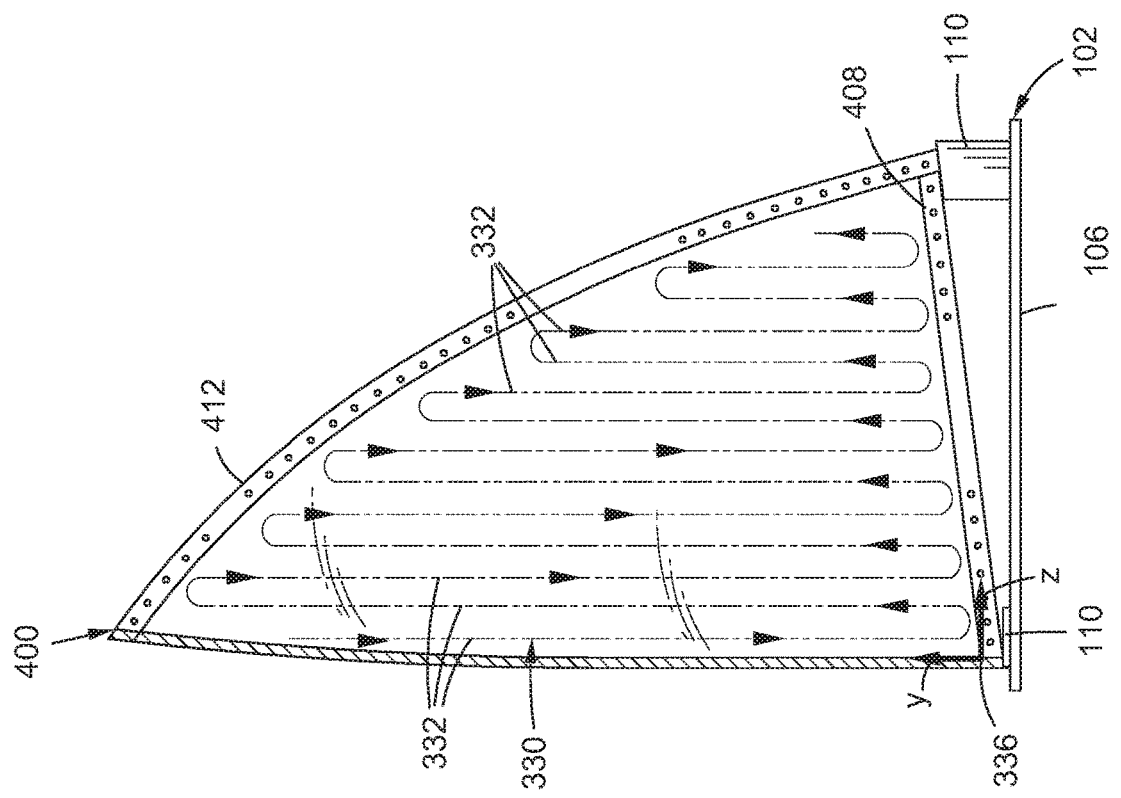
FIG. 2 is a side view of an example of a transparency showing a preprogrammed measurement path along which the imaging device can be moved by the robotic arm for recording images of the localized portions of the transparency.

The robotic arm 124 can be part of a robotic device 120. The robotic device 120 can include a robotic device base 122 that can be fixedly mounted to a fixture 102 which, in the example shown, is configured as a table 104. The robotic arm 124 can include one or more arm sections 128 connected by arm joints 130. The robotic arm 124 can have an arm end 126 to which the imaging device 200 can be coupled. The robotic arm 124 is configured to maintain the imaging device 200 in non-contacting proximity to the transparency 400 while moving the imaging device 200 along the measurement path 330 (FIGS. 2-3).

The presently-disclosed system 100 is described in the context of a transparency 400 configured as an aircraft windshield 412. The aircraft windshield 412 has a transparency frame 406 including an arch member 408 on an aft end of the aircraft windshield 412. The aircraft windshield 412 has a viewing portion 402 through which a pilot can view objects that are external to the aircraft windshield 412. The viewing portion 402 comprises the optically transparent portion of the aircraft windshield 412 that is unblocked by the transparency frame 406 or the arch member 408.

Although described in the context of an aircraft windshield 412, the system 100 can implemented for inspecting transparencies for use in any one of a variety of vehicular applications including marine, land, air and/or space vehicles. The system 100 can also be implemented for inspecting transparencies of non-vehicular applications. In addition, the system 100 can be configured to inspect transparencies of any one of a variety of sizes, shapes, and configurations. For example, the system 100 can be implemented for inspecting transparencies that are curved such as the above-mentioned aircraft windshield 412, or for inspecting an aircraft canopy (not shown) or an aircraft passenger window (not shown). The system 100 can also be implemented for inspecting transparencies that are non-curved, including transparencies that are planar or flat such as window panels or glazing materials used in building construction. The system 100 can also be implemented for inspecting transparencies used in any one of a variety of assemblies or systems such as instrumentation, lenses, lighting assemblies, and/or any type of transparent glassware, plastic, or polymeric structure. For a curved transparency 400, the imaging device 200 can be located on either the concave side of the transparency 400 (not shown), or the imaging device 200 can be located on the convex side of the transparency 400 as shown in FIG. 1.

Advantageously, the presently-disclosed system and method allows for detecting a wide variety of different types of optical defects with a high degree of resolution, such as the ability to detect defects of relatively small size (e.g., having a width of 0.010 inch or smaller). Additionally, the system and method allows for detecting optical defects in a transparency in a high-speed manner in order to reduce inspection time. Advantageously, the system is simple in construction, low in cost, and is adaptable for inspecting a wide range of transparency configurations. Furthermore, the system and method avoids the risk of damage to the transparency as may otherwise occur due to contact with the transparency. In addition, the system is capable of making continuous measurements of transmission loss over a substantial portion of a transparency in a timely and accurate manner.

Referring to FIGS. 1-3, the transparency 400 can be supported by the fixture 102 (e.g., a table 104). In the example shown, the aft end of the transparency 400 (e.g., the arch member 408) can be supported on a mounting plate 106 and can include one or more shim blocks 110 (FIGS. 2-3) or other suitable height-adjustable mechanisms to facilitate a generally vertical orientation of the transparency 400. The transparency 400 can be fixedly secured in position on the fixture 102 in a manner preventing movement of the transparency 400 during inspection. For example, temporary fasteners or mounting fixture pins 108 (FIG. 3) can be used to secure the transparency 400 to one or more of the shim blocks 110. In other examples, the transparency 400 can be supported without the aid of mechanical fasteners or mounting fixture pins 108. The fixture 102 can be provided in any one of a variety of configurations specific to the configuration of the robotic device 120 and specific to the configuration of the transparency 400. Furthermore, the transparency 400 can be arranged in any one of a variety of orientations, and is not limited to the generally vertical orientation shown in the figures.

Although not shown, the system 100 can optionally be configured to be removably mounted to the in-service environment of a transparency 400. For example, the system 100 can include a fixture (not shown) configured for removably coupling a robotic arm 124 to an aircraft interior such as to an interior of an aircraft cockpit (not shown). Once the fixture 102 is attached to the cockpit interior, the robotic arm 124 can be controlled by the processor 360 to move the imaging device 200 along a measurement path 330 of an aircraft windshield 412 or aircraft canopy enclosing the cockpit. As an alternative to removably coupling the robotic arm 124 to an aircraft interior, the robotic arm 124 can be configured to be removably coupled to an aircraft exterior for automated inspection of a transparency 400. As can be appreciated, the fixture (not shown) can be configured to be removably mounted to the in-service environment of any type of transparency 400 to allow for field inspection of the transparency 400, and is not limited to fixtures specifically configured for mounting to an aircraft.

Although not shown, the system 100 can optionally include an imaging background positionable on a side of the transparency 400 opposite the imaging device 200. The imaging background can be positioned in non-contacting proximity to the transparency 400 and can be configured to provide a smooth, continuous, uniform and/or homogenous background against which images 454 of the transparency 400 can be recorded. The imaging background can be configured such that at any point along the measurement path 330, the image 454 of a localized portion 452 of the transparency 400 is backed entirely by the imaging background. The imaging background can be contoured complementary to the contour of the transparency 400 in a manner minimizing variation in the spacing between the imaging background and the imaging background at different locations on the transparency 400. For examples where the transparency 400 is planar or flat, the imaging background can also be planar or flat.

An imaging background can be formed of any one of a variety of materials. In one example, an imaging background can be a sheet of material such as a metallic or polymeric sheet of uniform color. The color of the imaging background can be selected based upon the color of optical defects 210 for which the transparency 400 is inspected. For example, a light-colored (e.g., white) imaging background can be implemented for inspection of dark-colored optical defects 210 such as carbon particulates 212 embedded in a transparency 400. Alternatively, a dark-colored imaging background can be implemented for detection of light-colored defects. As an alternative to an imaging background, the system 100 can include a light source 230 (e.g., FIGS. 7-9) and can further optionally include a diffuser 234 and/or a reflector 236 (e.g., FIG. 8) as described in greater detail below. Such light source 230, diffuser 234, and/or reflector 236 can be configured complementary to the contour of the transparency 400 and can be located on a side of the transparency 400 opposite the imaging device 200 for backlighting the transparency 400. Alternatively or additionally, one or more light sources 230 can be mounted on the imaging device 200 (e.g., FIG. 9) for frontlighting the transparency 400 during the recording of images as described below.

Referring still to FIGS. 1-3, the system 100 includes the above-mentioned processor 360 which is configured to control the movement of the robotic arm 124 to move the imaging device 200 along the measurement path 330 of the transparency 400 while prompting the imaging device 200 to record images 454 (FIG. 6) of localized portions 452 (FIG. 6) of the transparency 400. In the example shown, the processor 360 can comprise or can include at least one controller 362 configured to control the robotic arm 124. The controller 362 can be communicatively coupled to the robotic device 120 by a controller cable 368. Additionally, the processor 360 can comprise or can include a computer 380 which can be communicatively coupled to the imaging device 200 by an imaging device cable 202 for controlling the operation of the imaging device 200 during movement along the measurement path 330. In addition, the computer 380 can be configured to analyze the images 454 recorded by the imaging device 200 for determining localized transparency characteristics. For example, the computer 380 can be configured to compare each of the images 454 of the localized portions 452 of the transparency 400 to a baseline image of the transparency 400 in a manner described below.

Figure 4:
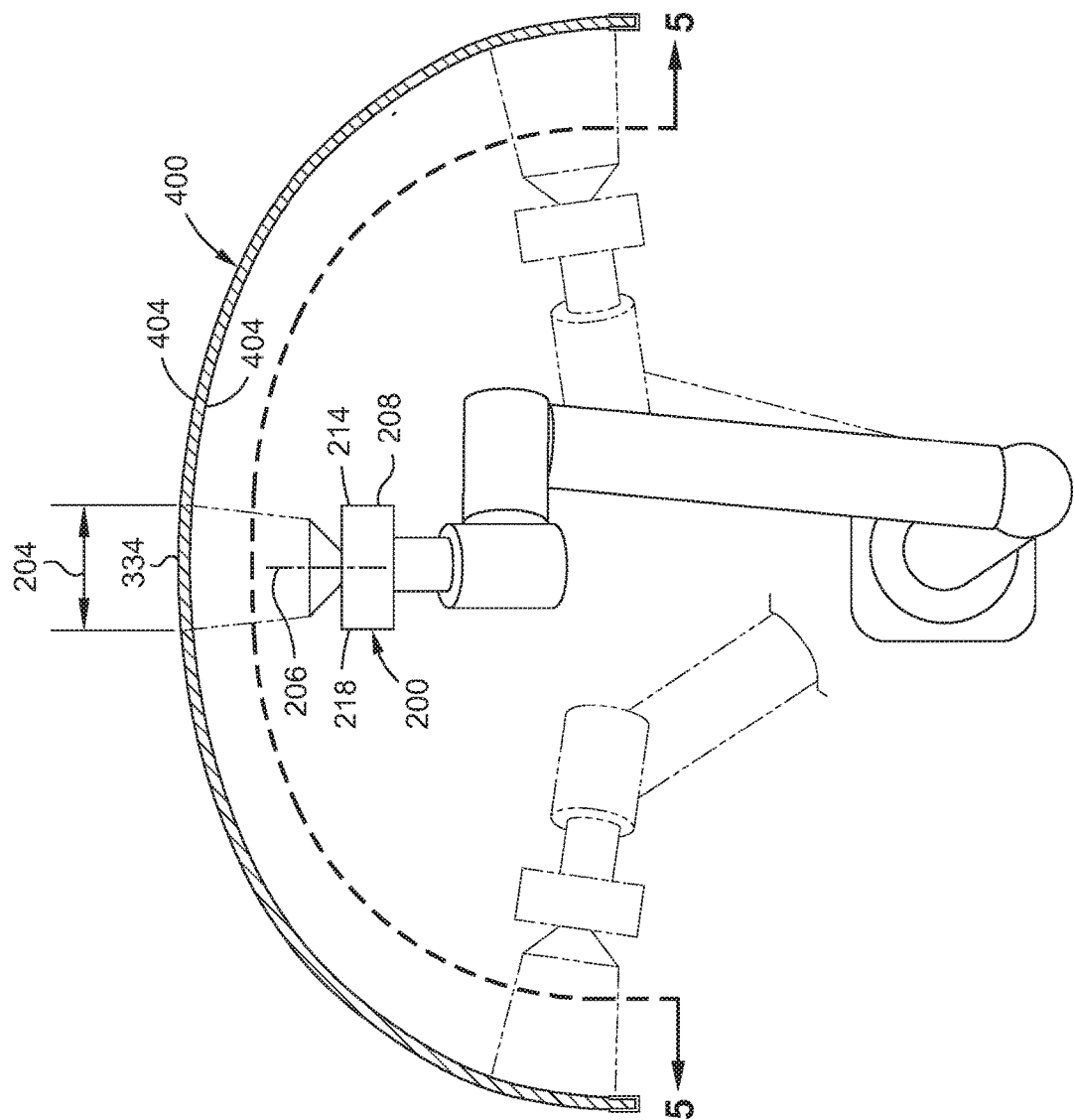
FIG. 4 is a top view of the system of FIG. 1 showing the curvature of the transparency and further illustrating the capability of the robotic arm to orient the imaging device locally perpendicular to the transparency surface at each of a plurality of measurement locations.

Referring to FIGS. 2-4, shown in FIGS. 2-3 is an example of a measurement path 330 on the transparency 400 and along which the imaging device 200 can be moved by the robotic arm 124. In this regard, the measurement path 330 can be described as the path of movement of a point defined by the intersection of the imaging device axis 206 (FIG. 4) and the transparency surface 404 (FIG. 4). The measurement path 330 can include a plurality of path sections 332 which are shown in FIGS. 2-3 as extending generally parallel to one another and generally oriented along a lengthwise direction of the aircraft windshield 412. The path sections 332 can be connected end-to-end to define a serpentine path along which the imaging device 200 can be moved by the robotic arm 124 for sequentially or continuously recording images 454 of localized portions 452 of the transparency 400 until the desired portion (e.g., an entirety of the viewing portion 402) of the transparency 400 has been inspected.

As shown in FIG. 4, the robotic arm 124 can be configured to maintain the imaging device 200 locally perpendicular to the transparency surface 404 at each measurement location 334 while moving the imaging device 200 along the path sections 332 of the measurement path 330. However, in other examples not shown, the robotic arm 124 can orient the imaging device 200 locally non-perpendicular to the transparency surface 404 at any one or more of the measurement locations 334 along the measurement path 330.

As shown in FIGS. 2-3, the adjacent path sections 332 can be spaced apart from each other by a spacing distance that corresponds to a field of view 204 (e.g., FIG. 4) of the imaging device 200. For example, the spacing distance between adjacent path sections 332 can be no greater than the width of the field of view 204 of the imaging device 200 to ensure that all portions of the transparency 400 are imaged by the imaging device 200 moving along the measurement path 330. In some examples, the spacing between the path sections 332 can be such that the field of view 204 of the imaging device 200 moving along one path section 332 partially overlaps with the field of view 204 of the imaging device 200 when moving along an adjacent path section 332. The measurement path 330 shown in FIGS. 2-3 is one example of any one of a variety of alternative arrangements for a measurement path 330 of a transparency 400. In this regard, a measurement path 330 can include path sections 332 that are oriented in any direction and arranged in any manner, and are not limited to the serpentine arrangement of path sections 332 shown in FIGS. 2-3.

Figure 5:
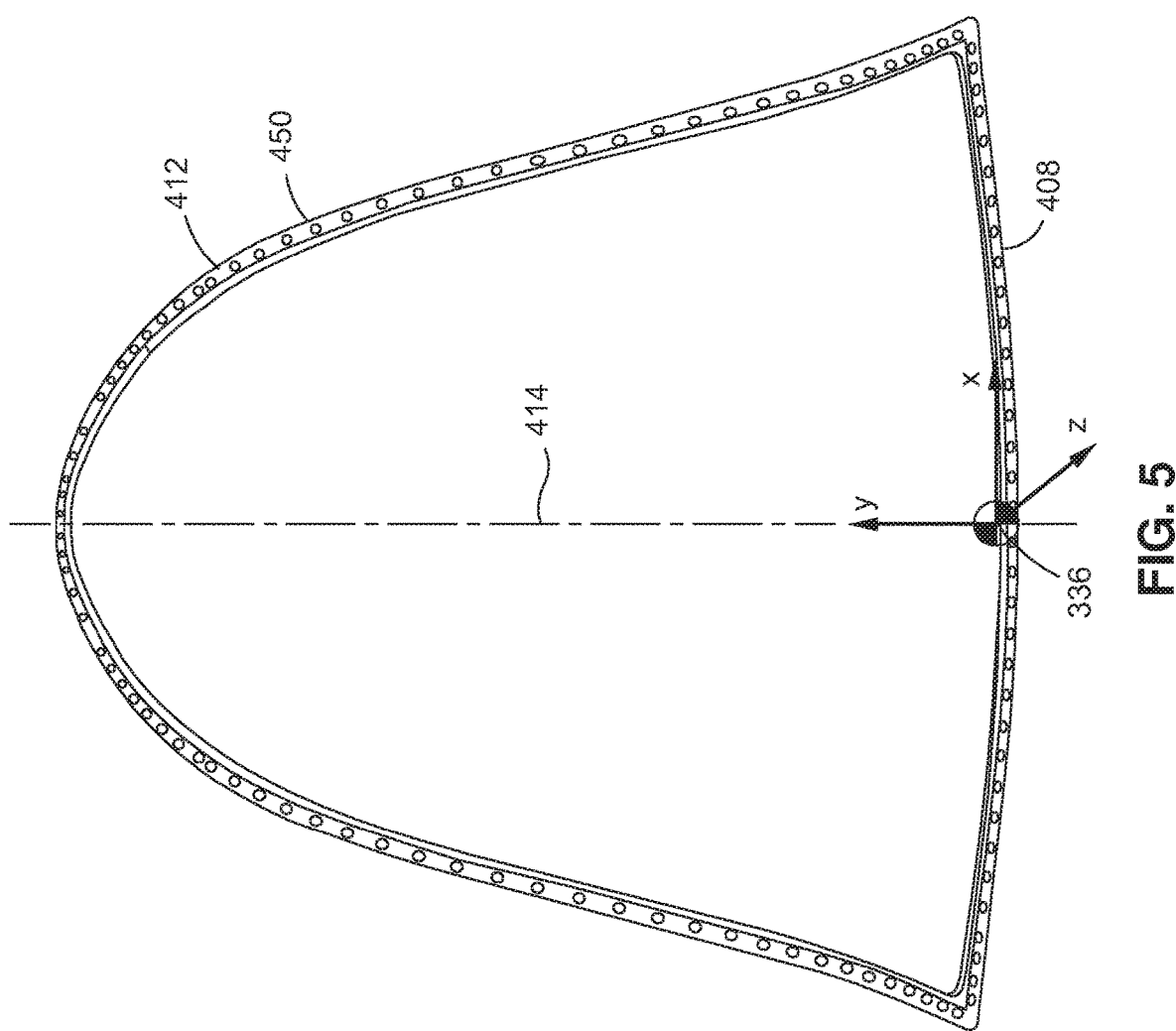
FIG. 5 is a flat pattern layout of the transparency taken along line 5-5 of FIG. 4 and illustrating an example of a reference location (0,0,0) on the transparency by which the measurement locations can be defined.

The measurement path 330 for the imaging device 200 can be defined via programmed movements (e.g., rotations) of the arm joints 130 (FIG. 1) of the robotic arm 124 (FIG. 1). The measurement path 330 can include a plurality of discrete measurement locations 334 (FIG. 6) on the transparency 400 for measurement of the transparency characteristics. The definition of the measurement path 330 and the measurement locations 334 can be based upon a three-dimensional digital definition (e.g., a computer-aided-design (CAD) model) of the transparency 400. The measurement locations 334 can be defined by x,y,z coordinates relative to a reference location 336 (0,0,0) which can be a predetermined physical point on the transparency 400. In the example shown, the reference location 336 is a point on the transparency surface 404 (e.g., the inner surface) of the windshield 412 at the intersection of the windshield 412 longitudinal centerline 414 with the arch member 408 as shown in FIG. 5, which illustrates a flat pattern layout 450 of the windshield 412. However, the reference location 336 can be any one of a variety of alternative physical points on the transparency 400.

During movement of the imaging device 200 along the measurement path 330, the processor 360 can prompt the imaging device 200 to record a sequence of static images 454 (FIG. 6) each covering a localized portion 452 (FIG. 6) of the transparency 400 and corresponding to a discrete measurement location 334 (FIG. 6) of the transparency 400. In some examples, the imaging device 200 can record a plurality of images 454 at a corresponding plurality of measurement locations 334. The imaging device 200 can be prompted to record images 454 of measurement locations 334 that can partially overlap with immediately adjacent measurement locations 334 as a means to avoid any gaps in the inspection of the transparency 400, as mentioned above. As an alternative to recording a sequence of static images 454 by the imaging device 200 when moving along the measurement path 330, the imaging device 200 can continuously record video of the transparency 400. A video recording can effectively define a continuous stream of images 454 of localized portions 452 of the transparency 400 for analysis by the processor 360.

As mentioned above, the imaging device 200 can be configured to continuously generate images 454 of the localized portions 452 of the transparency 400 during movement of the imaging device 200 by the robotic arm 124 along the measurement path 330. In addition, the processor 360 can continuously analyze the images 454 of the localized portions 452 and continuously determine the localized transparency characteristics and corresponding measurement locations 334 on the transparency 400 in real time. Advantageously, continuously generating images 454 and analyzing images 454 can result in a more robust inspection of the transparency 400 which can provide a complete definition of the overall quality of the transparency 400.

As mentioned above, the processor 360 is configured to determine one or more localized transparency characteristics respectively at one or more localized portions 452 of the transparency 400 along the measurement path 330 based on analysis of the images 454 of the localized portions 452. For example, the processor 360 can be configured to compare each one of the images 454 to at least one baseline image of a transparency sample (not shown) that is known to be free of optical defects 210, as described below. Defect-free baseline images can be recorded by imaging a transparency sample using the same type of imaging device 200 that is to be used to inspect the transparency 400. In addition, the one or more baseline images of the transparency sample can be recorded using the same set up of imaging background (not shown), light source 230 (FIGS. 7-8), diffuser 234 (FIG. 8), and/or reflector 236 (FIG. 8) that is to be used during the imaging of the transparency 400 under inspection. The one or more baseline images can be stored in a database of the processor 360 (e.g., the computer 380) prior to inspection of the transparency 400.

Stored or real-time images 454 of localized portions 452 of the transparency 400 under inspection can be compared on a pixel-by-pixel basis to one or more stored baseline images of the transparency sample in order to detect optical defects 210 in the transparency 400 under inspection. The comparison can be performed in real-time or after completion of the inspection of the transparency 400. For each image 454 of a localized portion 452 determined by the processor 360 to contain at least one optical defect 210, the processor 360 can also determine and record the size of each optical defect 210 in the image. The processor 360 can also identify and record the measurement location 334 (e.g., in terms of x,y,z coordinates) that corresponds to the image 454 containing the optical defects 210. As the imaging device 200 is moved along the measurement path 330, the processor 360 can location-stamp each image 454 recorded by the imaging device 200. The measurement location 334 (e.g., x,y,z coordinates) of each image 454 can be derived from instantaneous positional data of each arm joint 130 which can be continuously provided by the robotic device 120 to the processor 360 (e.g., the computer 380).

Figure 6:
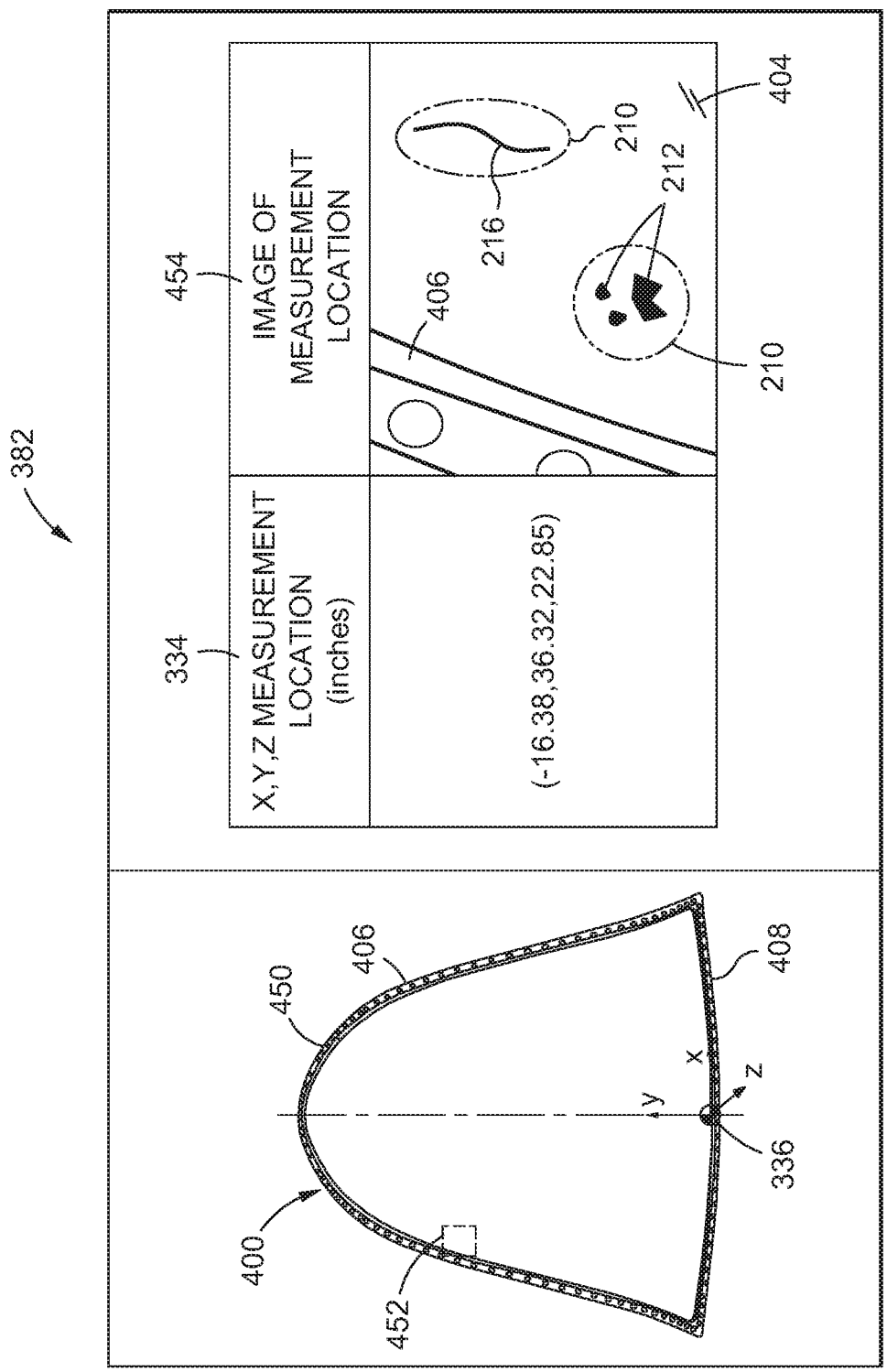
FIG. 6 shows an example of a readout of inspection of a transparency and showing an image of a localized portion of the transparency containing optical defects and listing the measurement location of the image on the transparency.

Referring to FIG. 6, shown is an example of a readout on a computer screen 382 (e.g., FIG. 1) during or after inspection of a transparency 400. The left-hand side of the readout shows a flat pattern layout 450 of the transparency 400 encircling the general location of a localized portion 452 of the transparency 400 determined by the processor 360 to contain one or more optical defects 210. Also shown in the flat pattern layout 450 is the reference location 336 (0,0,0) of the transparency 400. The right-hand side of the readout shows an image 454 of a localized portion 452 containing the optical defects 210 and lists the corresponding measurement location 334 (e.g., in x,y,z coordinates) of the localized portion 452. In the example shown, the optical defects 210 include carbon particulates 212 which can be detected by an imaging device 200 configured as a visible-light camera 208 (FIG. 4) as described in greater detail below. In addition, the optical defects 210 include a scratch 216 in the transparency surface 404 as can be detected by an imaging device 200 configured as an ultraviolet camera 214 (FIG. 4) as described in greater detail below. As mentioned above, the processor 360 can be configured to detect any one of a variety of different types of optical defects 210, and is not limited to detecting particulates 212 and/or scratches 216 in a transparency 400.

As mentioned above, in one example, the imaging device 200 can be configured as a camera (FIG. 4) configured to record images 454 of the transparency 400 for detecting localized optical defects 210 in the transparency 400. The camera can be the above-mentioned visible-light camera 208 configured to record images 454 of the transparency 400 in the visible spectrum (e.g., wavelength of 380-700 nm) and which can allow for detection of particulates 212, runs, and/or sags in the transparency 400 (FIG. 6). Particulates 212 can be comprised of carbon, dust, or other inclusions and can appear as relatively small black spots embedded within the transparency 400. Runs or sags (not shown) can comprise localized in-plane sagging of the material of the transparency 400. Light rays in the visible spectrum can be scattered by such runs and/or sags which can result in areas of optical distortion appearing in the images 454 recorded by the visible-light camera 208. The processor 360 can determine the locations of particulates 212, runs, and/or sags in the transparency 400 based on analysis of the images 454 of the localized portions 452. For example, as described above, the processor 360 can compare each image 454 to a baseline image of the transparency 400 known to be free of particulates 212, runs (not shown), and sags (not shown). In some examples, the visible-light camera 208 can have a resolution capability sufficient to record optical defects 210 having a width of 0.030 inch or less. In some examples, the visible-light camera 208 can be capable of recording optical defects 210 as small as 0.010 inch or less. In any of the examples disclosed herein, the camera can be a digital camera or an analog camera, and can be fitted with a lens (not shown) of any focal length.

Figure 7:
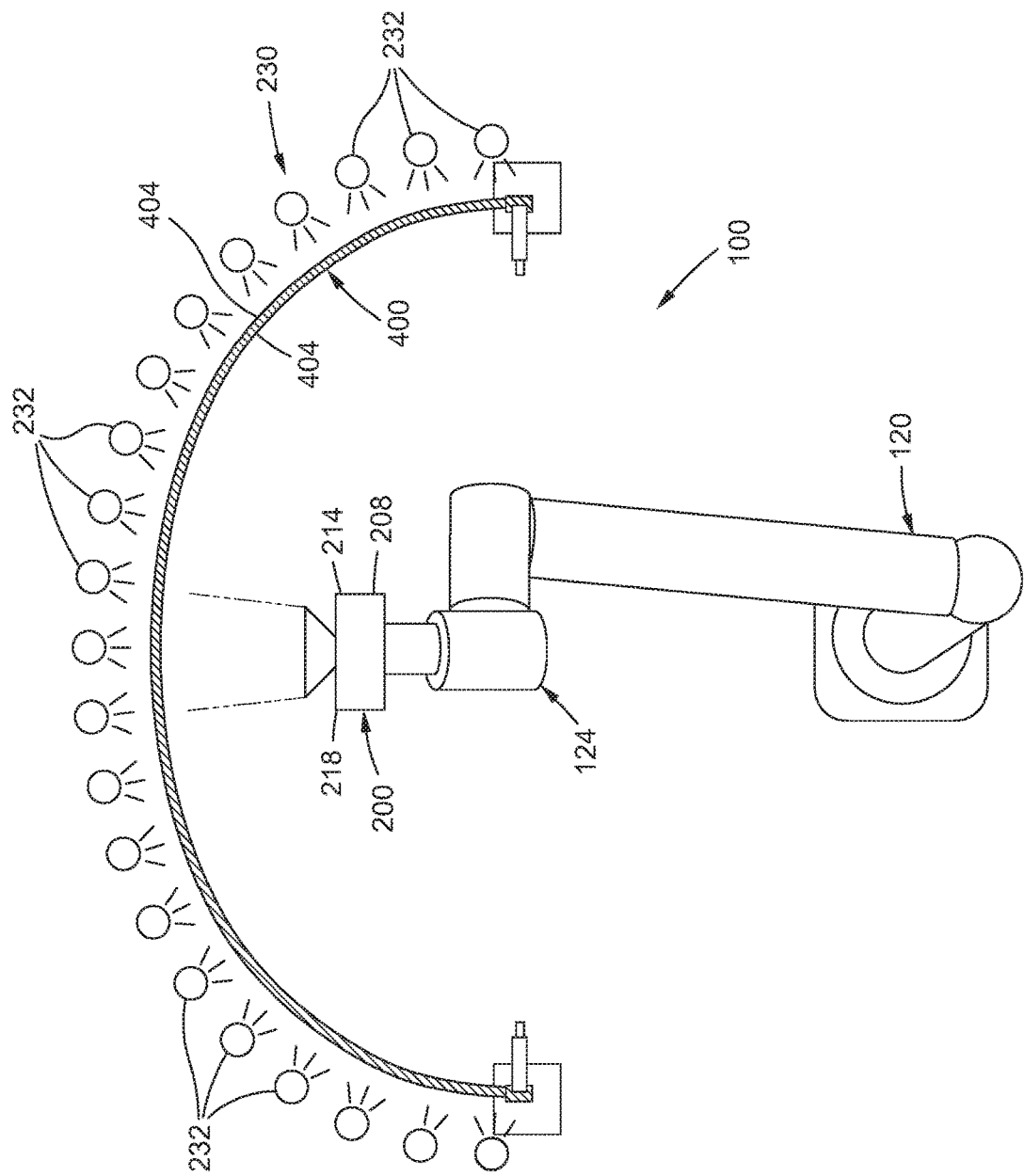
FIG. 7 is a top view of an example of a system having a light source positioned on a side of the transparency opposite the imaging device for backlighting the transparency during the recording of images.

Referring to FIG. 7, in some examples, the system 100 can include a light source 230 positionable on a side of the transparency 400 opposite the imaging device 200. The light source 230 can be configured to emit light in the visible spectrum for backlighting the transparency 400 during the recording of images 454 of the transparency 400 by the visible-light camera 208. Although not shown, the light source 230 can be supported by the same fixture 102 (e.g., FIG. 1) configured to support the transparency 400. The light source 230 can be configured to provide a homogenously illuminated background against which images 454 of the transparency 400 can be recorded by the imaging device 200.

In one example, the light source 230 can comprise a plurality of light-emitting elements 232 arranged complementary to the contour of the transparency 400 and configured to illuminate the transparency 400 during the recording of images 454 of the transparency 400. For example, the plurality of light-emitting elements 232 can be a plurality of fluorescent lamps (e.g., fluorescent tubes) oriented parallel to each other and arranged in an arcuate shape that is complementary to the cross-sectional shape of the transparency 400 and positioned at a uniformly spaced distance from the transparency surface 404. However, the light source 230 can be provided in alternative configurations such as an array of incandescent bulbs of any size, shape or configuration. In a still further example, the light source 230 can be configured as an array of light-emitting-diodes (LEDs) or other light source 230 configuration configured complementary to the contour of the transparency 400 and configured to provide a substantially uniform pattern of light for homogenously illuminating the transparency 400.

Figure 8:
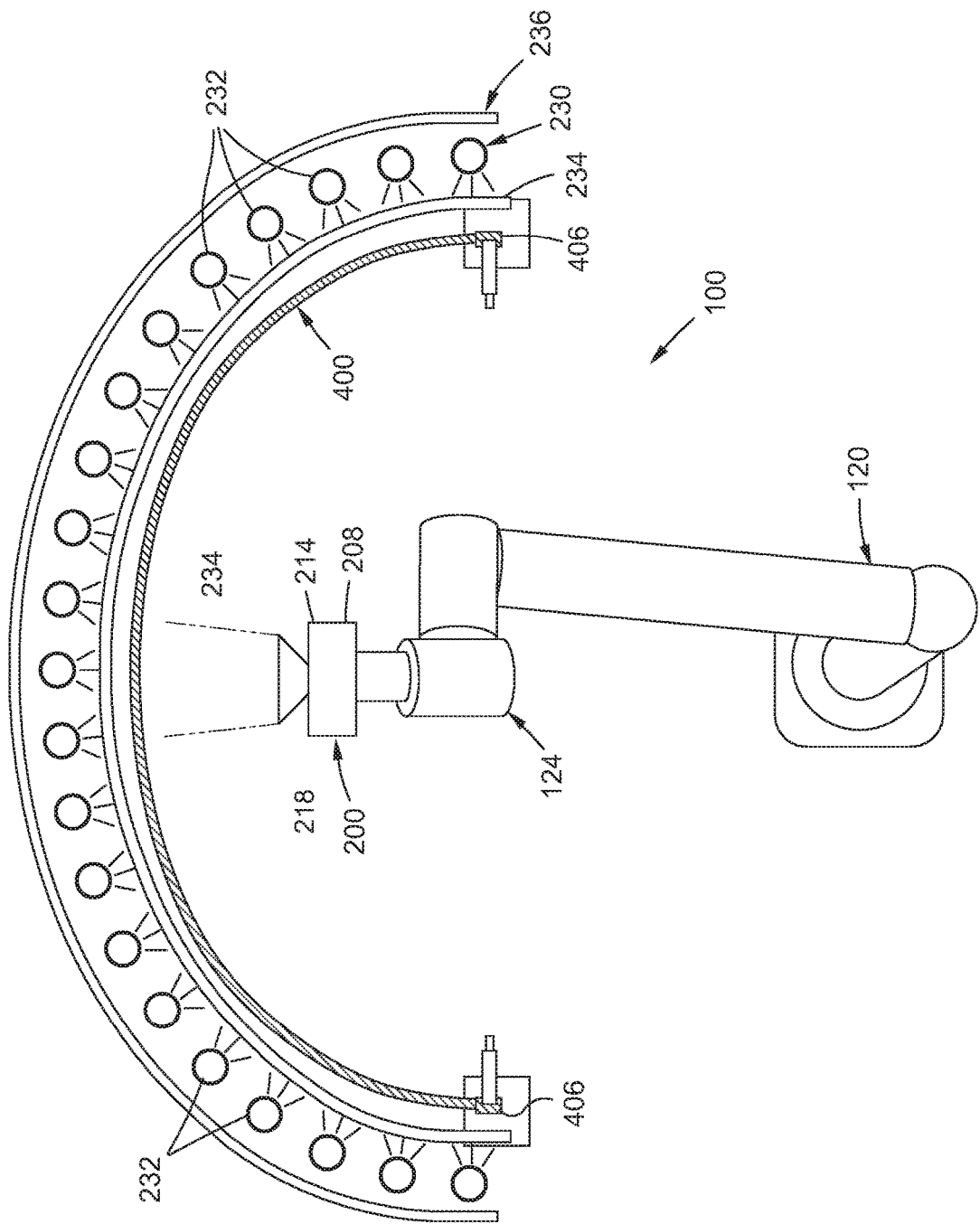
FIG. 8 is a top view of a further example of the system having a diffuser positioned between the light source and the transparency, and further including a reflector positioned on a side of the light source opposite the diffuser.

Referring to FIG. 8, shown is an example of a system 100 having a diffuser 234 positioned between the light source 230 and the transparency 400. Also shown is a reflector 236 positioned on a side of the light source 230 opposite the diffuser 234. The diffuser 234 can be configured to diffuse light emitted by the light source 230 for uniform backlighting of the transparency 400. In this regard, the diffuser 234 can be configured such that every measurement location 334 of the transparency 400 can be backlit with the same color of light and/or at the same level of intensity. Uniformly backlighting the transparency 400 can enable the detection of optical defects 210 in certain measurement locations 334 such as along the transparency frame 406 of the transparency 400 that can otherwise receive less ambient lighting than measurement locations 334 in central regions of the transparency 400.

The diffuser 234 can be supported by the same fixture 102 (FIG. 1) that supports the light source 230. The diffuser 234 can be shaped or contoured complementary to the transparency 400 and/or complementary to the contour of the light source 230. In this regard, the diffuser 234 is preferably shaped to mirror the shape of the transparency 400 at a spaced distance from the transparency 400 such that the transparency 400 is substantially uniformly backlit by the combination of the light source 230 and the diffuser 234. The diffuser 234 can be formed of any suitable sheet of material such as glass and/or polymeric material having a desired level of transmittance. In one example, the diffuser 234 can be formed of a substantially transparent sheet of material such as acrylic material (e.g., Plexiglas™) or polycarbonate material (e.g., Lexan™). The diffuser 234 material composition and material thickness can be selected to provide a desired level of transmittance of the light emitted by the light source 230. For example, the diffuser 234 can be configured to transmit in the range of 25-75% of the light emitted by the light source 230.

Referring still to FIG. 8, as mentioned above, the system 100 can optionally include a reflector 236 positionable on a side of the light source 230 opposite the transparency 400 and configured to reflect light emitted by the light source 230 toward the transparency 400. The light is preferably reflected along a direction toward the diffuser 234 in order to maximize the total amount of light that is provided to the diffuser 234. The reflector 236 facilitates homogenous illumination of the transparency 400. In addition, the reflector 236 can eliminate the occurrence of shadows, bright spots and/or hot spots in the diffuser 234. Similar to the above-described diffuser 234, the reflector 236 can also be supported by the same fixture 102 that supports the transparency 400. Alternatively, the reflector 236 can be integrated into the light source 230 such that the reflector 236 is an integral component of the light-emitting elements 232. The reflector 236 can be formed of a sheet of material contoured to match the shape of the light source 230 or the transparency 400. For example, the reflector 236 can be comprised of a sheet of paper, plastic, metal, or any one of a variety of other materials or combinations thereof. The reflector 236 can include a layer of paint or a coating or other suitable reflective surface finish.

Referring still to FIGS. 7-8, in one example, the imaging device 200 can be configured as an ultraviolet camera 214 configured to record images 454 of the transparency 400 in the ultraviolet spectrum. The ultraviolet camera 214 can operate in conjunction with the processor 360 (FIG. 1) to analyze images 454 (FIG. 6) generated by the ultraviolet camera 214 for detecting cracks (not shown), scratches 216, chips (not shown), or any other type of surface defect in one or both of the opposing transparency surfaces 404. The ultraviolet camera 214 can operate in the near-UV spectrum having a wavelength of 300-400 nm. The processor 360 can be configured to determine locations of such cracks, scratches 216, chips, or other surface defects based on analysis of the images 454 of the localized portions 452. For example, the processor 360 can compare each image generated by the ultraviolet camera 214 to an image of a defect-free transparency or an image of only the background against which the transparency 400 is to be inspected. In examples of the system 100 having a light source 230, the light source 230 can be configured to emit ultraviolet (UV) light and can be positionable on the same side of the transparency 400 as the ultraviolet camera 214 for front-lighting (e.g., FIG. 9) the transparency surfaces 404 during imaging by the ultraviolet camera 214.

Referring to FIG. 7, in another example of the system 100, the imaging device 200 can be a short wave infrared (SWIR) camera 218, and can operate in conjunction with the processor 360 (FIG. 1) to analyze images generated by the SWIR camera 218 for detecting moisture (not shown) in the transparency 400. The SWIR camera 218 can record moisture in the images of the transparency 400 based upon the tendency of moisture to absorb photons of infrared light, and resulting in the moisture appearing darker in images than surrounding moisture-free areas. The processor 360 can determine locations of moisture in the transparency 400 based on analysis of the images 454 of the localized portions 452 in a similar manner described above for detecting optical defects 210 such as particulates 212 and scratches 216. For example, the processor 360 can compare each image generated by the SWIR camera 218 to an image of a moisture-free or defect-free transparency, or an image of only the background against which the transparency 400 is to be inspected.

Figure 9:
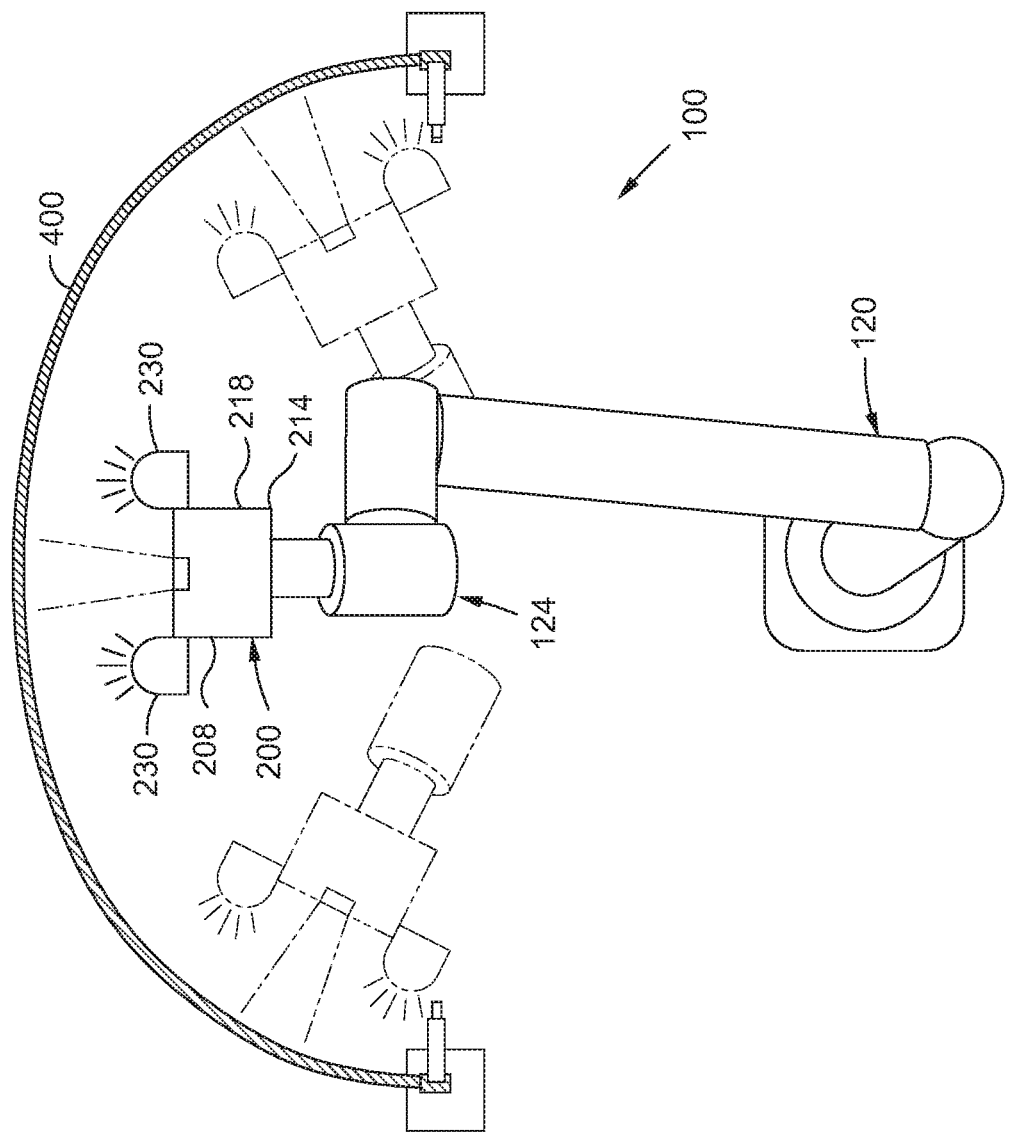
FIG. 9 is a top view of an example of the system having light sources mounted to the imaging device.

Referring to FIG. 9, shown is an example of a system 100 having a light source 230 positionable on the same side of the transparency 400 as the imaging device 200 for front-lighting the transparency 400 during imaging by the imaging device 200. In the example shown, a pair of light sources 230 are mounted respectively on opposite sides of the imaging device 200. However, the imaging device 200 can include a single light source 230 or the imaging device 200 can include more than two (2) light sources 230 mounted at any location on the imaging device 200. The imaging device 200 can be provided in any one of the configurations disclosed herein including a visible-light camera 208, an ultraviolet camera 214, an SWIR camera 218, or any other type of camera. In FIG. 9, one or more of the light sources 230 mounted to the imaging device 200 can be configured to emit light in the any one of a variety or combinations of spectrums including the visible spectrum (e.g., wavelength of 380-700 nm), the near-UV spectrum (e.g., wavelength of 300-400 nm), the SWIR spectrum (e.g., wavelength of 1400-3000 nm), and/or in other spectrums to facilitate the detection of optical defects for which the imaging device 200 is configured to detect. For example, for a visible-light camera 208, the light source(s) 230 can emit light in the visible spectrum. For an ultraviolet camera 214, the light source(s) 230 can emit light in the near-UV spectrum. For an SWIR camera 218, the light source(s) 230 can emit light in the SWIR spectrum. The light source(s) 230 mounted on the imaging device 200 can be configured as one or more fluorescent bulbs, one or more incandescent bulbs, one or more light-emitting-diodes (LEDs), and/or in other lighting configurations.

Although not shown, the imaging device 200 can be provided in a variety of other configurations as an alternative to the above-described visible-light camera 208, ultraviolet camera 214, or SWIR camera 218. For example, the imaging device 200 can be configured as a pyranometer configured to measure the transmittance of a coating 410 such as a solar-reflective coating that can be included with the transparency 400. In another example, the imaging device 200 can be configured as a reflectometer configured to measure the reflectance of a coating 410.

Advantageously, in addition to the ability to orient the imaging device 200 locally perpendicular (e.g., within ±1 degree) to the transparency surface 404 such as for a visible-light camera 208, an ultraviolet camera 214, and/or an SWIR camera 218, the robotic arm 124 can also be controlled in a manner to orient the imaging device 200 at a locally non-perpendicular angle relative to the transparency surface 404 when moving the imaging device 200 along the measurement path 330 (FIGS. 2-3). The robotic arm 124 can accurately (e.g., within ±1 degree) control the orientation of the imaging device 200 during movement along the measurement path 330 such that the imaging device axis 206 is maintained at any one of a variety of specific non-perpendicular angles relative to the transparency surface 404. For example, the robotic arm 124 can maintain the orientation of the imaging device 200 such that the imaging device axis 206 is consistently and accurately maintained at an angle of 85 degrees, 80 degrees, 70 degrees, or at any other specific angle relative to the transparency surface 404, and which is not achievable using the above-mentioned manually-operated calipers held in free space without the aid of supplemental equipment guides, as mentioned above. Advantageously, orienting the imaging device 200 at any one of a variety of specific locally non-perpendicular angles can simulate one or more critical angles at which solar radiation or other types of radiation impinges on a transparency 400 such as an aircraft windshield 412. As mentioned above, the robotic device 120 can be positioned on either the concave side of a transparency 400 (e.g., FIG. 7-8) or on the convex side of the transparency 400 (not shown) for moving the imaging device 200 along the measurement path 330.

Figure 10:
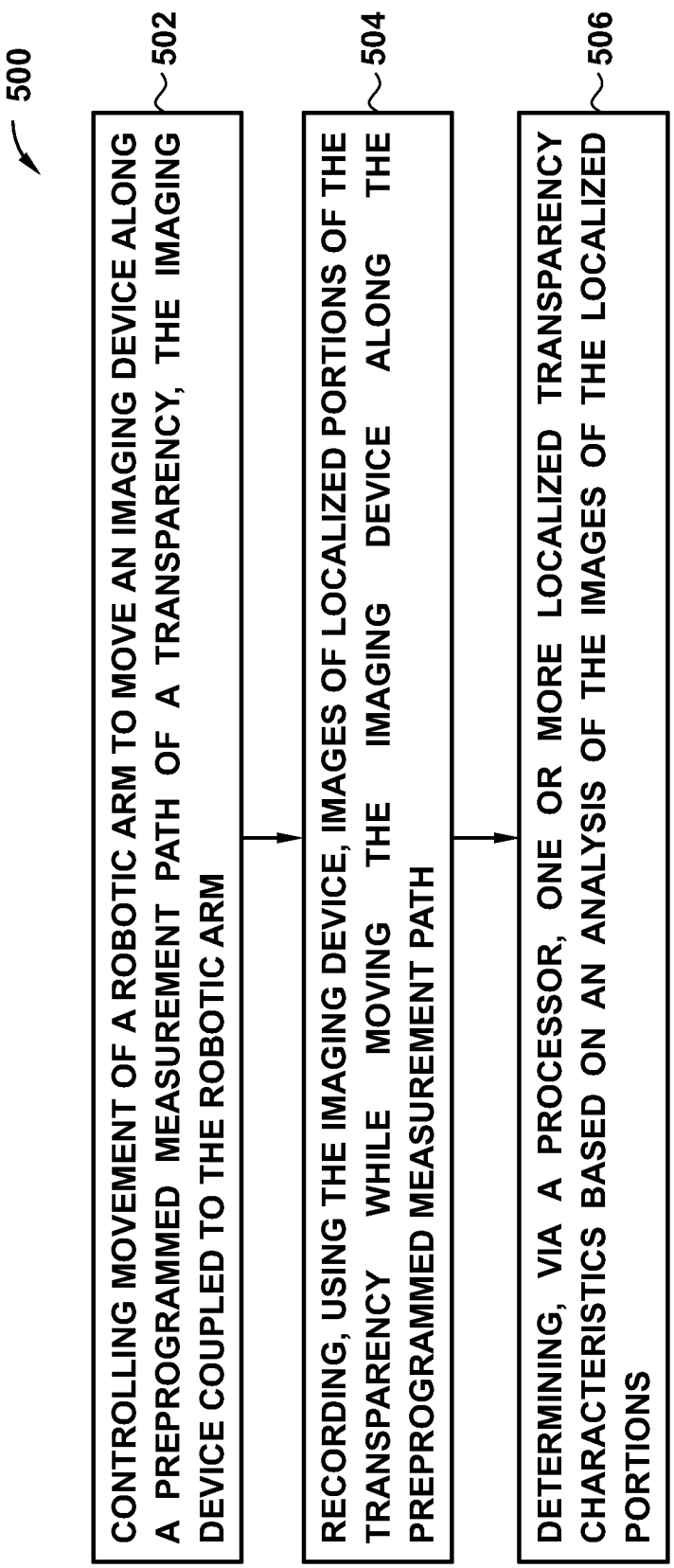
FIG. 10 is a flowchart of operations included in a method of determining the localized characteristics of a transparency using an imaging device movable by a robotic arm along a measurement path of the transparency.

Referring to FIG. 10, shown is a flowchart of operations included in a method 500 of determining the localized characteristics of a transparency 400. The method 500 includes step 502 of controlling movement of a robotic arm 124 of a robotic device 120 to move an imaging device 200 along a preprogrammed measurement path 330 of a transparency 400, as described above and shown in FIGS. 1, 4, and 7-9. As also described above, the imaging device 200 is coupled to the robotic arm 124 which is controlled by the processor 360 to move the imaging device 200. As mentioned above and shown in FIG. 1, the processor 360 can be configured as a controller 362 communicatively coupled to the robotic device 120 by a controller cable 368.

The method 500 further includes step 504 of recording, using the imaging device 200, images 454 of localized portions 452 of the transparency 400 while moving the imaging device 200 along the measurement path 330. FIGS. 2-3 show an example of a measurement path 330 comprised of a plurality of parallel path sections 332 connected end-to-end. However, as mentioned above, the measurement path 330 can be provided in any one of a variety of arrangements, and is not limited to the example shown in FIGS. 2-3.

The method 500 further includes step 506 of determining, via the processor 360, one or more localized transparency characteristics based on an analysis of the images 454 of the localized portions 452. In one example, step 506 of determining localized transparency characteristics can comprise comparing the images 454 to a baseline image to determine at least one localized transparency characteristic. In the above-described example, the baseline image can be a defect-free image of the same or similar portion of a transparency sample (not shown). Alternatively, the baseline image can be an image of only the background against which the transparency 400 is to be inspected. For example, the baseline image can be an image of a localized portion of an imaging background (e.g., a sheet of material—not shown) as described above. Alternatively, the baseline image can be an image of a localized portion of the light source 230 (FIG. 7) configured to backlight the transparency 400 to be inspected. In still further examples, the baseline image can be an image of a localized portion of a diffuser 234 (FIG. 8) configured to provide homogenous backlighting for the transparency 400 to be inspected.

The above-described steps of inspecting the transparency 400 can be performed on a continuous basis. For example, step 502 of controlling movement of the robotic arm 124, step 504 of recording the images 454 of the localized portions 452, and step 506 of determining one or more localized transparency characteristics can respectively comprise continuously moving the imaging device 200 along the measurement path 330, continuously recording the images 454 of the localized portions 452 while moving the imaging device 200 along the measurement path 330, and continuously determining one or more localized transparency characteristics. The method can optionally include continuously comparing (e.g., in real time) the image 454 of each localized portion 452 on a pixel-by-pixel basis to a baseline image for real-time detection of optical defects 210 in the transparency 400 under inspection.

In some examples, step 504 of recording the images 454 of the localized portions 452 can comprise illuminating, using a light source 230, at least one of opposing sides of the transparency 400 during the recording of the images 454. For example, as shown in FIG. 8, illuminating at least one of opposing sides of the transparency 400 can comprise backlighting the transparency 400 during the recording of images 454 of the transparency 400 using a light source 230 positioned on a side of the transparency 400 opposite the imaging device 200. Alternatively, the method can include frontlighting the transparency 400 during the recording of images 454 of the transparency 400. As shown in the example of FIGS. 7-8, the transparency 400 can be illuminated using a plurality of light-emitting elements 232 arranged complementary to a contour of the transparency 400. The plurality of light-emitting elements 232 can be arranged parallel to each other and can be oriented along a lengthwise direction of the transparency 400. However, as mentioned above, the light source 230 can be provided in any one of a variety different configurations such as a plurality of light-emitting-diodes, a plurality of incandescent bulbs, or other arrangements.

Referring briefly to FIG. 8, the method 500 can optionally include diffusing the light emitted by the light source 230 for uniform backlighting of the transparency 400 using a diffuser 234 positionable between the light source 230 and the transparency 400. As mentioned above, the diffuser 234 can be configured to reduce or limit variation in the intensity or color with which the transparency 400 is backlit, thereby improving the ability to detect optical defects 210 at any location within the transparency 400. Detection capability can be further improved by reflecting the light emitted by the light source 230 back toward the transparency 400 or toward the diffuser 234 using a reflector 236 as shown in FIG. 8. As mentioned above, the reflector 236 can eliminate shadows and/or bright spots that can otherwise occur in the diffuser 234.

The method 500 can include recording images 454 using an imaging device 200 that is complementary to the type of defect for which the transparency 400 is being inspected. For example, to detect optical defects 210 that are embedded within the transparency 400, step 504 of recording the images 454 of the localized portions 452 and step 506 of determining one or more localized transparency characteristics can respectively comprise recording the images 454 using a visible-light camera 208 configured to record images 454 in the visible spectrum, and determining locations of particulates 212, runs, and/or sags in the transparency 400 based on analysis of the images 454 of the localized portions 452. As shown in FIG. 8 and described above, for detecting surface defects located in one or both of the opposing transparency surfaces 404, step 504 of recording the images 454 of the localized portions 452 and step 506 of determining one or more localized transparency characteristics can respectively comprise using an ultraviolet camera 214 to record the images 454 of the transparency 400 in the ultraviolet spectrum, and determining the locations of cracks, scratches 216, chips and/or other surface defects based on analysis of the images 454 of the localized portions 452. For example, the method can include comparing the images 454 to a defect-free baseline image as described above.

For detecting moisture (not shown) within the transparency 400, the method 500 can include using an SWIR camera 218 to record moisture in the transparency 400, and determining locations of the moisture in the transparency 400 based on analysis of the images 454 of the localized portions 452. As mentioned above, for an image 454 of a localized portion 452 determined to contain an optical defect 210, the processor 360 can identify the type of optical defect 210, the size of the optical defect 210, and identify the measurement location 334 (e.g., in terms of x,y,z coordinates) on the transparency 400. As described above, FIG. 6 shows an example of a readout of optical defect 210 characteristics and measurement location 334 as can be displayed on a computer screen 382 during or after inspection of the transparency 400. In some examples, the method 500 can include frontlighting the transparency 400 using one or more light sources 230 during the recording of images as the imaging device 200 is moved along the measurement path 330. For example, the above-described FIG. 9 illustrates light sources 230 mounted to the imaging device 200 for frontlighting the transparency 400 during imaging of the transparency 400.

Figure 11:
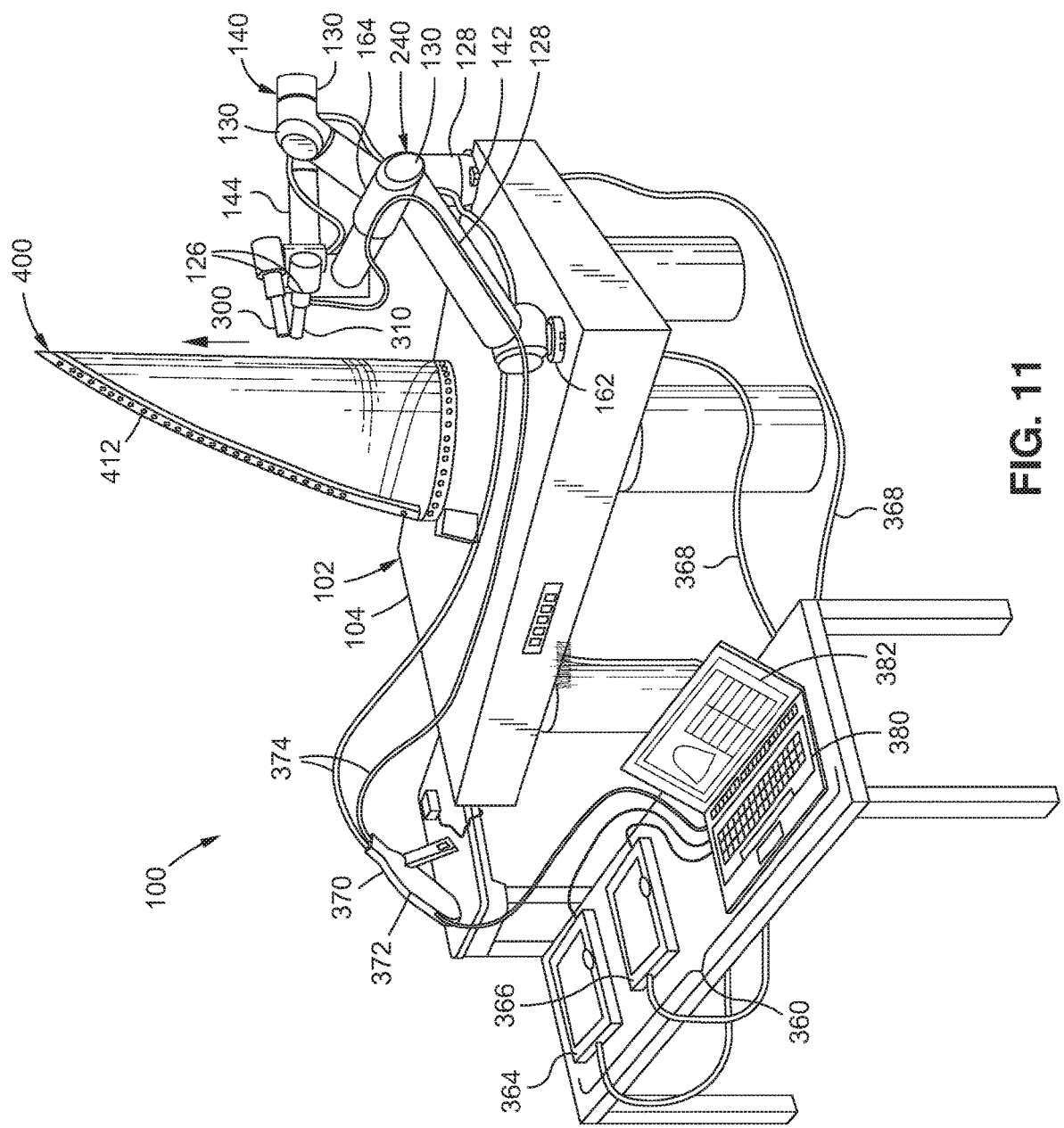
FIG. 11 is a perspective view of an example of a system for determining localized characteristics of a transparency shown supported on a fixture and further illustrating a first robotic arm and a second robotic arm positioned on a same side of a transparency and operated in a coordinated manner to respectively move a transmitting horn and a receiving horn along a preprogrammed measurement path for determining localized characteristics of the transparency.

Referring now to FIG. 11, shown is another example of a system 100 for determining localized characteristics of a transparency 400. The system 100 of FIG. 11 includes a pair of horns 300, 310 (e.g., antennae) respectively to transmit and receive a focused electromagnetic energy beam or signal to determine the attenuation (e.g., transmission loss and/or reflection loss) in signal strength due to impingement on the transparency 400. Similar to the arrangement in FIG. 1, the transparency 400 of FIG. 11 can be supported on a fixture 102 such as a table 104. However, as indicated above, the fixture 102 can be provided in any one of a variety of alternative configurations specific to the type of transparency 400 to be inspected. Furthermore, as mentioned above for FIG. 1, the system 100 of FIG. 11 can be implemented for inspecting any one of a variety of transparency configurations, and is not limited to inspection of an aircraft windshield 412. Furthermore, the system 100 of FIG. 11 can allow for determining the effectiveness of one or more coatings 410 (FIG. 12) on the transparency 400.

Figure 12:
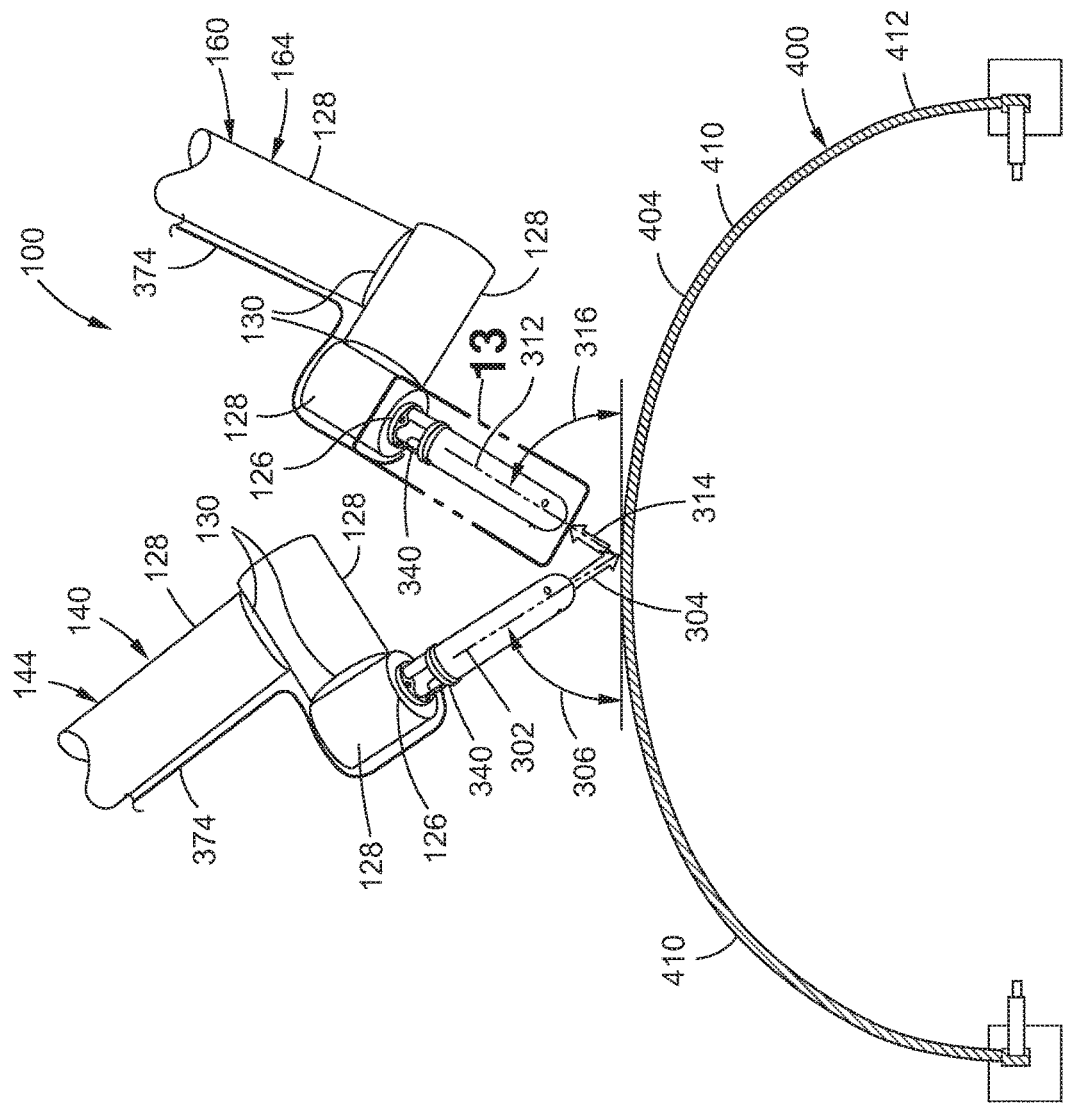
FIG. 12 is a top view of the system of FIG. 11 showing the transmitting horn and the receiving horn oriented at complementary angles relative to each other and to the transparency.

In FIGS. 11-12, the system 100 includes a first robotic arm 144 of a first robotic device 140. The first robotic arm 144 can have multiple arm sections 128 connected by arm joints 130. In addition, the first robotic arm 144 has an arm end 126. The first robotic device 140 can be controlled by a first controller 364 (e.g., a processor 360) via a controller cable 368. The system 100 also includes a second robotic arm 164 of a second robotic device 160. The second robotic arm 164 can also have multiple arm sections 128 connected by multiple joints. The second robotic arm 164 also has an arm end 126. The second robotic device 160 can be controlled by a second controller 366 (e.g., the processor 360) via a controller cable 368. As an alternative to controller cables 368, the first controller 364 and the second controller 366 can be wirelessly coupled respectively to the first robotic device 140 and second robotic device 160. In the example shown, the first robotic device 140 and the second robotic device 160 respectively have a first robotic device base 142 and a second robotic device base 162 that can be secured to the fixture 102 which, in the example, shown comprises a table 104.

However, as described above for the robotic device of FIG. 1, the system 100 of FIG. 11 can be provided in a portable configuration (not shown) including a fixture 102 for removably mounting the first robotic arm 144 and second robotic arm 164 to the in-service environment of the transparency 400 to be inspected. For the example of an aircraft windshield 412, the fixture 102 can be configured to allow the first robotic arm 144 and the second robotic arm 164 to be configured to be removably coupled to an interior of an aircraft cockpit to allow for the in-field inspection of the aircraft windshield 412 and/or aircraft canopy similar to the above-described optional arrangement for the system 100 of FIG. 1. However, such fixture 102 is not limited to mounting to an aircraft cockpit, and can be configured for removably coupling the first robotic arm 144 and second robotic arm 164 to the in-service environment of any one of a variety of different types of transparencies. In a still further example not shown, the system 100 can include a fixture 102 configured for removably coupling the first robotic arm 144 to the in-service environment on one side of the transparency 400, and for removably coupling the second robotic arm 164 to the same in-surface environment on the opposite side of the transparency 400.

Figure 13:
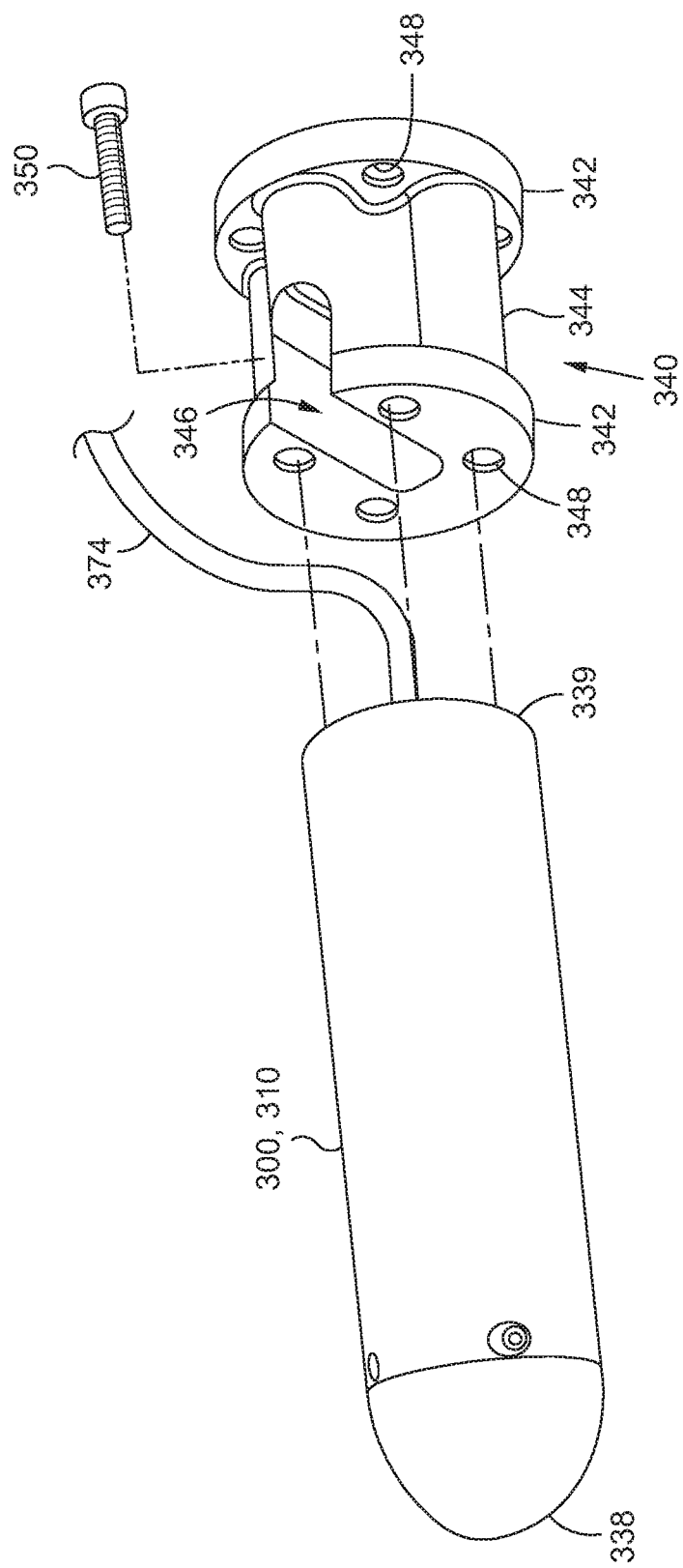
FIG. 13 is an exploded magnified view of a portion of the system identified by reference numeral 13 of FIG. 12 and illustrating an example of a horn-arm connector fitting for coupling the transmission horn to the first robotic arm and/or for coupling the receiving horn to the second robotic arm.

Referring to FIGS. 11-13, as mentioned above, the system 100 includes a pair of horns including a transmitting horn 300 and a receiving horn 310. The transmitting horn 300 is coupled to the arm end 126 of the first robotic arm 144. The receiving horn 310 is coupled to the arm end 126 of the second robotic arm 164. The transmitting horn 300 is positionable by the first robotic arm 144 in immediate non-contacting proximity to the transparency 400 and is configured to emit an emitted signal 304 (FIG. 12) for impingement on the transparency 400. The emitted signal 304 comprises a focused beam of electromagnetic radiation as described in greater detail below.

Referring to FIG. 13, the transmitting horn 300 and the receiving horn 310 can each be described as an antenna having dielectric rods encapsulated in a dielectric material (e.g., a polymeric material) and configured to emit (i.e., transmit) and receive focused electromagnetic energy. As an example, the transmitting horn 300 and receiving horn 310 can be commercially available from Compass Technology Group, Alpharetta, Georgia, and can be available in a length of approximately 5-25 cm (approximately 2-10 inches) and a diameter of approximately 5 cm (approximately 2 inches). In the example shown, the transmitting horn 300 and receiving horn 310 each have a length of approximately 18 cm (approximately 7 inches). The transmitting horn 300 and receiving horn 310 each have a horn tip 338 and a bottom end 339. The bottom end 339 of the transmitting horn 300 and receiving horn 310 can include a connector port (not shown) for connection to the coaxial cable 374 which is communicatively coupled to the processor 360 (e.g., a spectrum analyzer 370).

The electromagnetic energy can be focused as a beam (not shown) emitted at the horn tip 338 and focused and directed in alignment with the transmitting horn axis 302. The beam diameter can increase in size with distance from the horn tip 338. For example, the beam can have a diameter of approximately 3 cm (1.2 inches) at a distance of approximately 2.5 cm (approximately 1 inch) from the horn tip 338, and a diameter of approximately 6.3 cm (approximately 2.5 inches) at a distance of approximately 7.6 cm (3 inches) from the horn tip 338. The transmitting horn 300 and/or the receiving horn 310 can each be capable of emitting a beam having a diameter of approximately 3-8 cm (approximately 1.2-3.2 inches) in front of the horn tip 338. In some examples, the transmitting horn 300 can emit an emitted signal 304 within a frequency range of 2-40 GHz. However, in other examples, the transmitting horn 300 can emit an emitted signal 304 that is outside of the 2-40 GHz frequency range. The transmitting horn 300 can be configured to emit an emitted signal 304 that is within the frequency range of electromagnetic radiation to which the transparency 400 can be subjected when placed in service. The receiving horn 310 can receive a received signal 314 that is complementary to or within the frequency range of the emitted signal 304.

As mentioned above, the processor 360 (FIG. 11) is configured to control the first robotic arm 144 and the second robotic arm 164 to respectively maintain the transmitting horn 300 and the receiving horn 310 in non-contacting relation to the transparency 400 at all times to avoid damage to the transparency 400. In some examples, the transmitting horn 300 and receiving horn 310 can each be maintained at a distance of approximately 5-8 cm (approximately 2-3 inches) from the transparency surface 404 (FIG. 13). The system 100 can include proximity sensors (not shown) as part of a built-in safety mechanism in which the movement of the first robotic arm 144 and/or second robotic arm 164 is halted if either the first robotic arm 144 and/or second robotic arm 164 comes within a predetermined distance (e.g., within 1 inch) of any type of object (e.g., the transparency 400) or a human (e.g., a technician) as a means to prevent physical contact by either the transmitting horn 300 or the receiving horn 310.

In the example of FIGS. 11-13, the receiving horn 310 is positionable by the second robotic arm 164 on the same side of the transparency 400 as the transmitting horn 300. In addition, the receiving horn 310 is positionable in immediate non-contacting proximity to the transparency 400, and is configured to receive the received signal 314 comprising at least a portion of the emitted signal 304 after transmission of the emitted signal 304 through the transparency 400 and/or after reflection of the emitted signal 304 off of the transparency surface 404. The arrangement in FIGS. 11-13 represents operation in a bi-static reflection mode in which the transmitting horn 300 is limited to emitting the emitted signal 304 and the receiving horn 310 is limited to receiving the received signal 314. Although FIGS. 11-13 show the transmitting horn 300 and the receiving horn 310 on the convex side of the transparency 400 for inspection of the transparency 400, in other examples not shown, the transmitting horn 300 and the receiving horn 310 can be positioned on the concave side of the transparency 400 for inspection of the transparency 400.

In FIGS. 11-13, the system 100 includes the processor 360 as mentioned above. The transmitting horn 300 and the receiving horn 310 are each communicatively coupled via the coaxial cable 374 to the processor 360 which can comprise or can include a spectrum analyzer 370. As mentioned above, the processor 360 can comprise or include the first controller 364 for controlling the first robotic arm 144. In addition, the processor 360 can comprise or include the second controller 366 for controlling the second robotic arm 164. The processor 360 (e.g., the first controller 364 and the second controller 366) is configured to move the first robotic arm 144 and second robotic arm 164 in a coordinated manner along a preprogrammed measurement path 330 such as the example measurement path 330 shown in FIGS. 2-3 and described above. The measurement path 330 can be defined via programmed movements (e.g., rotations) of the arm joints 130 respectively of the first robotic arm 144 and second robotic arm 164, similar to the above-described arrangement for the system 100 of FIG. 1.

Referring to FIGS. 12-13, the transmitting horn 300 and the receiving horn 310 can be coupled to the arm end 126 respectively of the first robotic arm 144 and second robotic arm 164 via a horn-arm connector fitting 340. As mentioned above, the transmitting horn 300 and the receiving horn 310 are each communicatively coupled to the processor 360 via a coaxial cable 374. Each coaxial cable 374 is attached to a port (not shown) at the bottom end 339 of the transmitting horn 300 and receiving horn 310. As shown in FIG. 13, the horn-arm connector fitting 340 has opposing fitting ends 342 interconnected by a fitting intermediate portion 344. Each one of the fitting ends 342 has one or more fastener holes 348. One fitting end 342 can be fastened to the arm end 126 of the first robotic arm 144 or second robotic arm 164. The opposite fitting end 342 can be fastened to the transmitting horn 300 or receiving horn 310 via threaded fasteners 350.

Referring still to FIGS. 12-13, each horn-arm connector fitting 340 additionally has a cable slot 346 extending along a side of the horn-arm connector fitting 340. The cable slot 346 is configured to allow the coaxial cable 374 to extend outwardly from the bottom end 339 of the transmitting horn 300 or receiving horn 310 and route the coaxial cable 374 toward an exterior side respectively of the first robotic arm 144 and second robotic arm 164 with a minimal amount of bending of the coaxial cable 374. In this regard, the cable slot 346 in each horn-arm connector fitting 340 is configured to allow for a relatively large bending radius of the coaxial cable 374 as the coaxial cable 374 extends from the bottom end 339 of the transmitting horn 300 and receiving horn 310. Each horn-arm connector fitting 340 is also configured to facilitate optimized or improved movement of the transmitting horn 300 and receiving horn 310 along the measurement path 330 while minimizing bending loads (e.g., by maximizing the bending radii) of the coaxial cable 374 during all phases of movement of the transmitting horn 300 and receiving horn 310. Advantageously, minimizing bending loads on the coaxial cables 374 (e.g., via the horn-arm connector fitting 340) in conjunction with optimizing or improving the measurement path 330 of the transmitting horn 300 and receiving horn 310 results in a reduced amount of cable-generated signal noise that would otherwise affect (e.g., skew) the emitted signal 304 and/or the received signal 314 which would adversely impact the accuracy of measurements (e.g., transmission coefficients 458) during inspection of the transparency 400.

Referring to FIGS. 11-13, the processor 360 (e.g., the first controller 364 and the second controller 366) can control the first robotic arm 144 and second robotic arm 164 in a manner to maintain the transmitting horn 300 and the receiving horn 310 in complementary orientation relative to each other and to the transparency surface 404 while moving the transmitting horn 300 and receiving horn 310 along the measurement path 330. For example, as shown in FIG. 12, the processor 360 can control the first robotic arm 144 to maintain the transmitting horn axis 302 at a predetermined emitted angle 306 relative to the transparency 400. Simultaneous with controlling (e.g., via the first controller 364) the first robotic arm 144 to maintain the transmitting horn axis 302 at an emitted angle 306, the processor 360 (e.g., a second controller 366) can control the second robotic arm 164 to maintain the receiving horn axis 312 at a reflected angle 316 relative to the transparency 400. In some examples, the second robotic arm 164 can control the orientation of the receiving horn 310 such that the reflected angle 316 is maintained substantially (e.g., within 5 degrees) equivalent to the emitted angle 306 while the transmitting horn 300 and receiving horn 310 are moved along the measurement path 330.

The transmitting horn 300 and the receiving horn 310 can be moved along the measurement path 330 oriented at multiple angles. The transmitting horn 300 and the receiving horn 310 can each be maintained at a specific locally non-perpendicular angle relative to the transparency surface 404. For example, the transmitting horn 300 and receiving horn 310 can make a first pass along the measurement path 330 while oriented at a first value of the emitted angle 306 and reflected angle 316, after which the transmitting horn 300 and receiving horn 310 can make another pass along the measurement path 330 oriented at a second value of the emitted angle 306 and reflected angle 316, optionally followed by any number of additional passes along the measurement path 330 with the transmitting horn 300 and receiving horn 310 oriented at a different angle during each pass. As mentioned above, any one or more of a variety of emitted angles 306 can be selected the transmitting horn 300 to simulate one or more angles at which external electromagnetic radiation can impinge on the transparency 400 in its intended service environment. Similar to the above-described capability of the robotic arm 124 of the system of FIG. 1, the first robotic arm 144 and the second robotic arm 164 of the system of FIGS. 11-12 and 16 can accurately (e.g., within ±1 degree) control the orientation respectively of the transmitting horn axis 302 and the receiving horn axis 312 at any one of a variety of specific non-perpendicular angles relative to the transparency surface 404 during movement of the transmitting horn 300 and receiving horn 310 along the measurement path 330.

In addition to controlling the orientation of the transmitting horn 300 and receiving horn 310 relative to the transparency surface 404, the processor 360 can also be configured to cause the first robotic arm 144 and the second robotic arm 164 to respectively rotate (not shown) the transmitting horn 300 and the receiving horn 310 respectively about the transmitting horn axis 302 and the receiving horn axis 312 to change the polarization respectively of the emitted signal 304 and the received signal 314 to horizontal polarization, vertical polarization, and/or cross-polarization. For example, during a first pass along the measurement path 330, the first robotic arm 144 and the second robotic arm 164 can respectively orient the transmitting horn 300 and receiving horn 310 for horizontal polarization respectively of the emitted signal 304 and received signal 314. During a second pass along the measurement path 330, the first robotic arm 144 and the second robotic arm 164 can respectively orient the transmitting horn 300 and receiving horn 310 for vertical polarization respectively of the emitted signal 304 and received signal 314. For cross-polarization respectively of the emitted signal 304 and received signal 314 during a third pass along the measurement path 330, the first robotic arm 144 and the second robotic arm 164 can respectively orient the transmitting horn 300 and receiving horn 310 at a 45° angle relative to the orientation for horizontal or vertical polarization.

Referring still to FIG. 12, as mentioned above, the processor 360 is configured to prompt the transmitting horn 300 to emit an emitted signal 304 while the receiving horn 310 receives the received signal 314. In one example, the processor 360 can prompt the transmitting horn 300 to periodically emit an emitted signal 304. For example, the transmitting horn 300 can emit an emitted signal 304 after being moved to each one of a plurality of measurement locations (not shown) which can be spaced apart along the measurement path 330. Alternatively, the transmitting horn 300 can continuously emit the emitted signal 304 during movement along the measurement path 330 such that the measurement locations 334 are contiguous and continuous along the measurement path 330. The measurement locations 334 can be defined in terms of x,y,z coordinates relative to a reference location 336 (0,0,0—e.g., FIGS. 2-3, 5 and 14). As described above, the measurement path 330 and the measurement locations 334 can be based on a three-dimensional digital definition (e.g., a CAD model) of the transparency 400.

The processor 360 (e.g., the analyzer 370) is configured to determine at least one transparency characteristic of at least one measurement location 334 based on an analysis of the received signal 314. For example, the processor 360 can determine the transparency characteristic at a given measurement location 334 by comparing the received signal 314 to the emitted signal 304 to determine transmission losses in the emitted signal 304 after transmission through, absorption into, and/or reflection off of the transparency 400. The processor 360 can measure transmission losses in the emitted signal 304 at a variety of frequencies in the bandwidth of the emitted signal 304. In some examples, the processor 360 can compare the transmission loss represented by the received signal 314 at each measurement location 334 to a baseline signal to determine whether the transmission loss falls within predetermined minimum and maximum values of transmission loss of the baseline signal as a measure of whether the transparency 400 meets design requirements.

As shown in FIG. 11, the analyzer 370 can be communicatively coupled to the computer 380. The processor 360 (e.g., the computer 380) can receive data from the analyzer 370 and can record and/or display the transparency characteristics determined by the processor 360 (e.g., the analyzer 370). Such transparency characteristics can include the signal frequency 456 and corresponding transmission coefficients 458 and measurement locations 334 (e.g., in x,y,z coordinates). In addition, the processor 360 can record other transparency characteristics corresponding to the transmission coefficients 458 such as the value of the emitted angle 306, the reflected angle 316, and the type of signal polarization (e.g., horizontal, vertical, cross-polarization).

Figure 14:
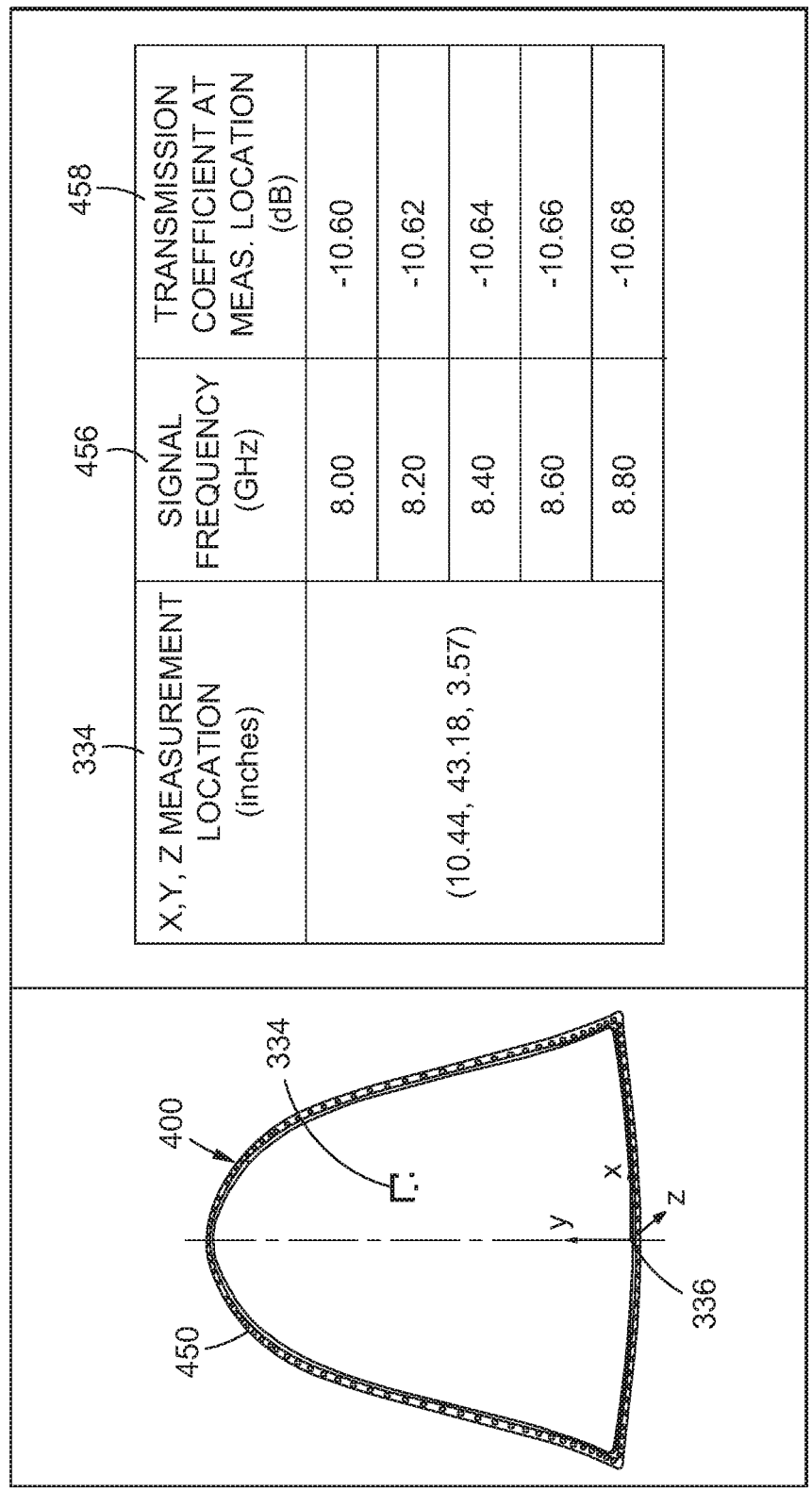
FIG. 14 shows an example of a readout of a localized characteristic at a measurement location on a transparency for which the localized characteristic is the transmission coefficients (i.e., transmission losses) for radiation at different frequencies impinging on the measurement location.
Figure 15:
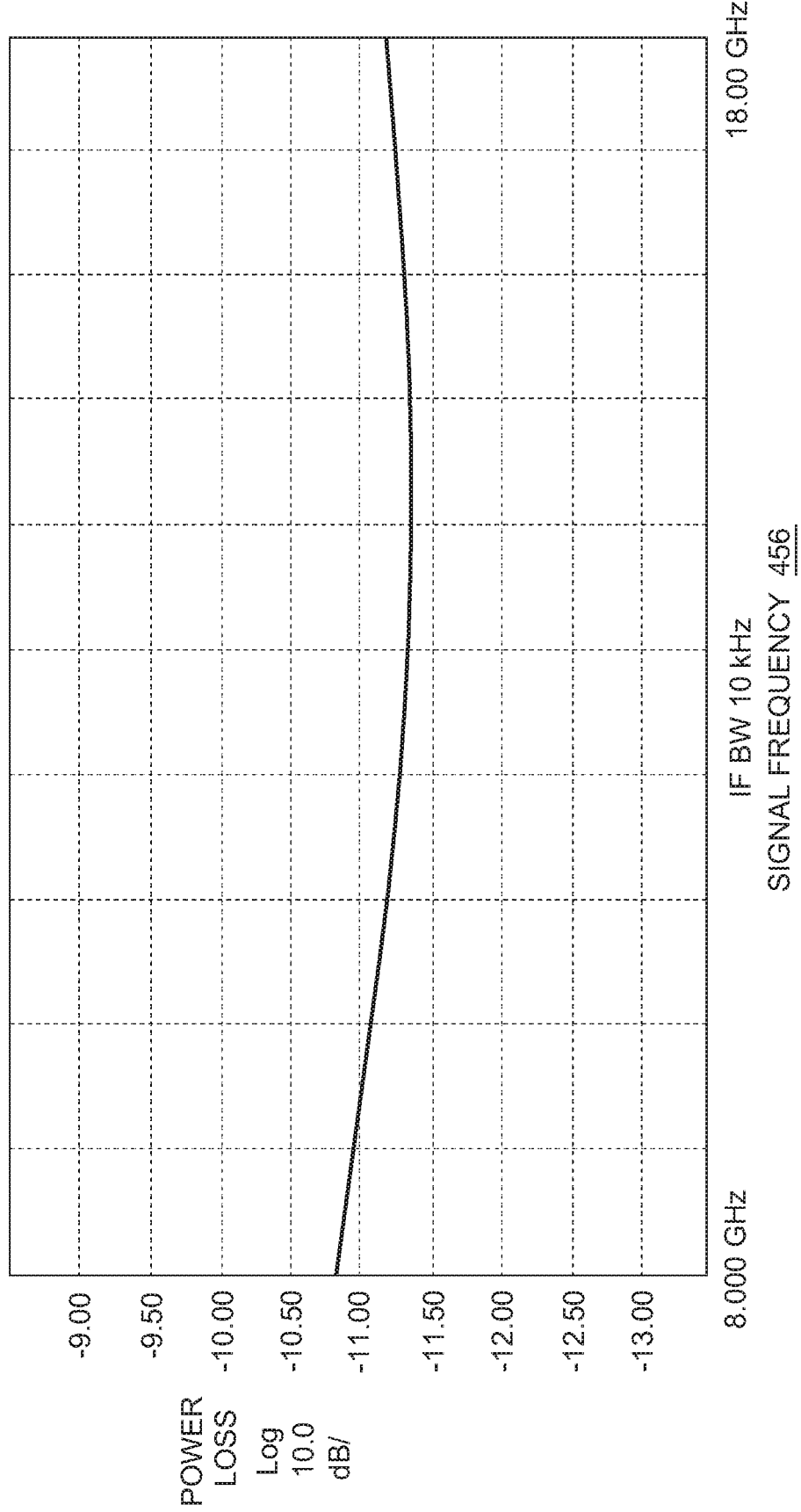
FIG. 15 is a graph of signal frequency vs. energy loss of an emitted signal at a measurement location on the transparency as an example of a localized characteristic of the transparency as measured by the system of FIG. 11.

Referring to FIG. 14, shown is an example of a readout on a computer screen 382 (FIG. 11) of the localized characteristics at a measurement location 334 on a transparency 400 during or after inspection of the transparency 400. In the example shown, the left-hand side of the readout shows a flat pattern layout 450 of the transparency 400 and identifying the measurement location 334 of the transparency 400. The right-hand side of the readout shows a chart listing the coordinates (x,y,z) of the measurement location 334, and listing the transmission coefficients 458 (e.g., the transmission losses) at the measurement location 334 for each of the listed signal frequencies 456. FIG. 15 shows an example of a graph of signal frequency 456 vs. power loss of an emitted signal 304 at a measurement location 334 on the transparency 400. The graph can be displayed on the analyzer screen 372 (FIG. 11) or on the computer screen 382 (FIG. 11). For the signal bandwidth of 8-18 GHz, the transmission coefficient 458 in the range of −10.5 to −11.5 dB as an example of a localized characteristic of the transparency 400 as measured by the system 100 of FIG. 11.

As mentioned above, in some examples, the transparency 400 can include one or more coatings 410 (FIG. 12) such as a metallized coating and/or an electrically conductive coating. The processor 360 can be configured to determine the effectiveness of the coating 410 by comparing the emitted signal 304 to the received signal 314, and accounting for transmission losses due to the transparency 400 alone (e.g., without any coatings 410) as a means to determine the electromagnetic attenuation or transmission loss produced by the coating 410 itself.

As indicated above, the system 100 of FIG. 11 can be configured to determine transparency characteristics on a continuous basis during inspection of a transparency 400. For example, the transmitting horn 300 can continuously emit the emitted signal 304 and the receiving horn 310 can continuously receive the received signal 314 during movement of the first robotic arm 144 and second robotic arm 164 along the preprogrammed measurement path 330. The processor 360 can continuously analyze the received signal 314 and continuously determine and record the transparency characteristics and corresponding measurement locations 334 on the transparency 400.

Figure 16:
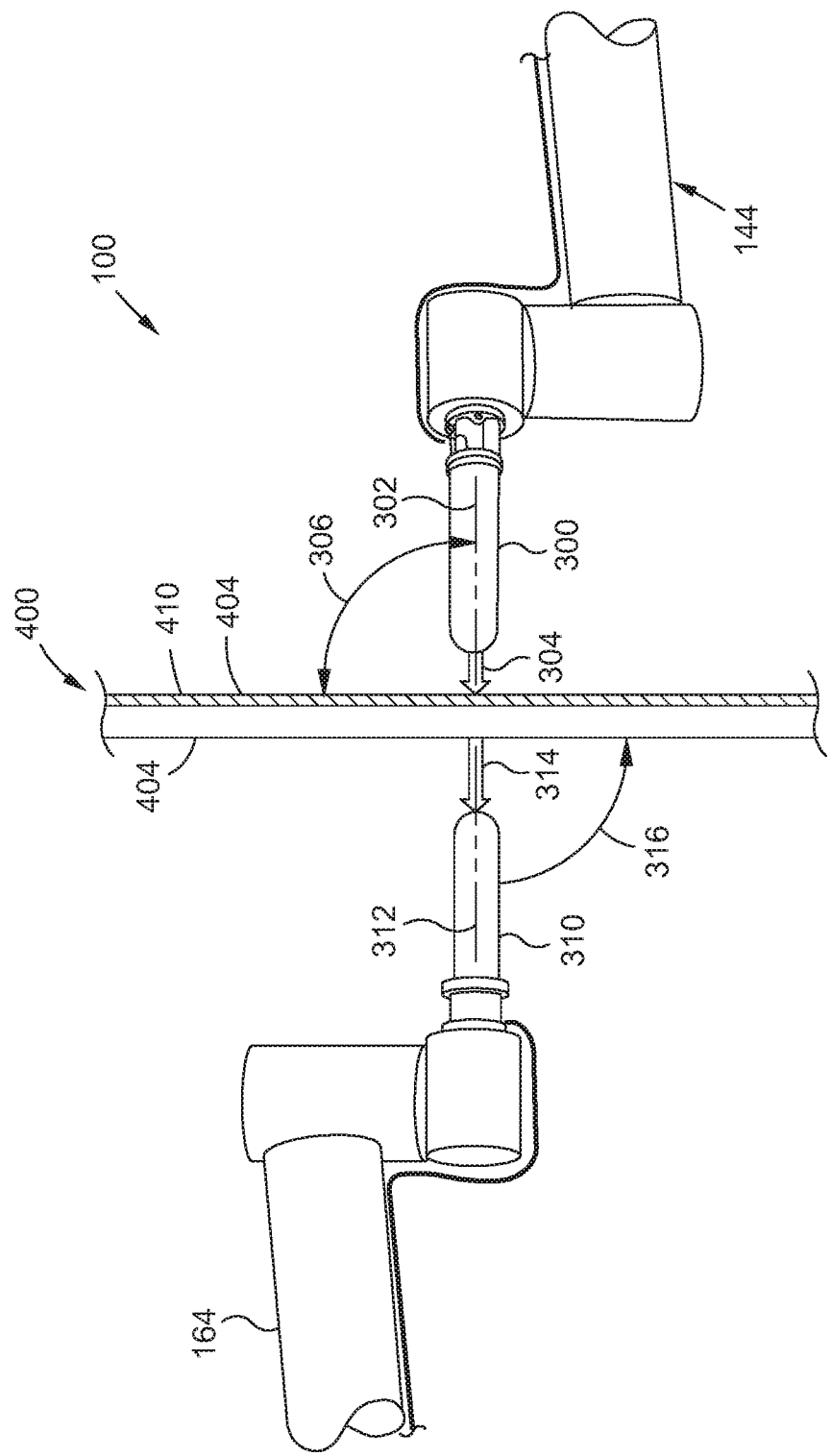
FIG. 16 shows an example of a system in which the transmitting horn and the receiving horn are located on opposite sides of the transparency.

Referring to FIG. 16, shown is an alternative to the arrangement shown in FIGS. 11-13 in which the transmitting horn 300 and the receiving horn 310 are positioned on opposite sides of the transparency 400. In the arrangement of FIG. 16, the transmitting horn 300 and the receiving horn 310 can be operated in either the above-described bi-static reflection mode or in a mono-static reflection mode. In the mono-static reflection mode, the transmitting horn 300 is capable of emitting an emitted signal 304 and receiving the received signal 314, and the receiving horn 310 is also capable of emitting an emitted signal 304 and receiving the received signal 314.

For the example (FIG. 16) in which the transmitting horn 300 and receiving horn 310 are positioned on opposite sides of the transparency 400, the first controller 364 and the second controller 366 can maintain the transmitting horn 300 and the receiving horn 310 in parallel relation to each other and in alignment with each other while moving the transmitting horn 300 and receiving horn 310 along the measurement path 330. For example, the first controller 364 (FIG. 11) and the second controller 366 (FIG. 11) can respectively control the first robotic arm 144 and the second robotic arm 164 in a manner to maintain the transmitting horn axis 302 and the receiving horn axis 312 in alignment with each other during movement of the transmitting horn 300 and receiving horn 310 along the measurement path 330.

Although FIG. 16 shows the transmitting horn axis 302 and the receiving horn axis 312 maintained in a locally perpendicular orientation to the transparency surface 404 (e.g., see emitted angle 306 and received angle 316), in an alternative example not shown, the processor 360 can maintain the transmitting horn axis 302 and the receiving horn axis 312 at a locally non-perpendicular orientation relative to the transparency surface 404 during movement of the transmitting horn 300 and receiving horn 310 along the measurement path 330. Advantageously, orienting the transmitting horn 300 and receiving horn 310 at any one of a variety of specific locally non-perpendicular angles relative to the transparency surface 404 can allow for simulating a non-perpendicular incident angle of solar radiation or electromagnetic radiation impinging on the transparency 400 in its in-service environment. The transmitting horn 300 and receiving horn 310 can be oriented at a variety of different non-perpendicular angles during successive passes of the transmitting horn 300 and receiving horn 310 along the measurement path 330, as mentioned above for the system 100 shown in FIGS. 11-12.

Figure 17:
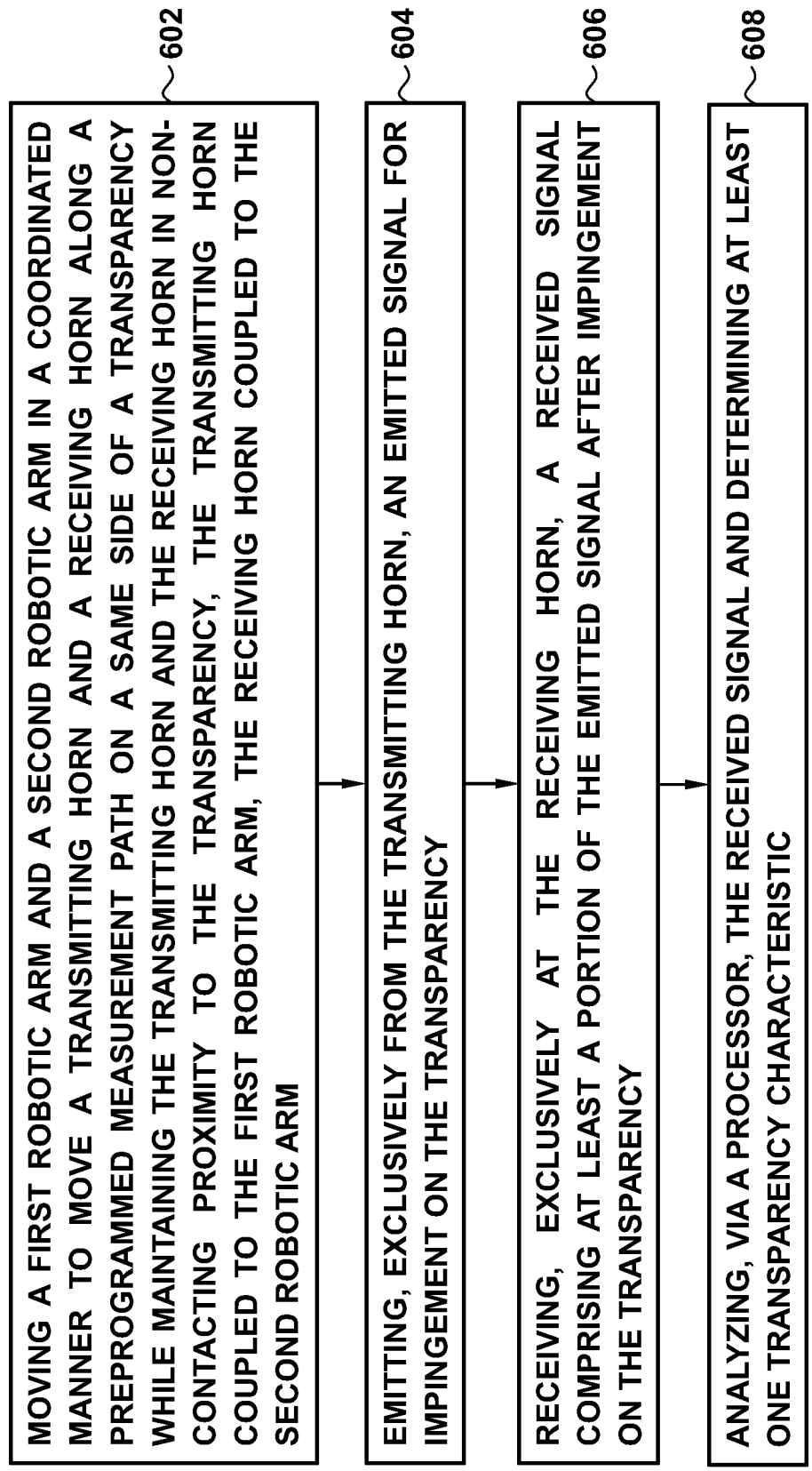
FIG. 17 is a flowchart of operations included in a method of determining localized characteristics of a transparency using a transmitting horn and a receiving horn movable along a measurement path of a transparency respectively by a first robotic arm and a second robotic arm.

Referring to FIG. 17, shown is a flowchart of operations included in a method 600 of determining localized characteristics of a transparency 400. Although the method 600 is described in the context of an aircraft windshield 412, the method can be implemented for an aircraft canopy, an aircraft passenger window, or any one of a variety of different sizes, shapes and configurations of transparencies for use in any one of a variety of applications. The method can include calibrating the location of the transmitting horn 300 and the receiving horn 310. For example, calibration can be performed by bringing the transmitting horn 300 and receiving horn 310 together at a known three-dimensional location (not shown) relative to the fixture 102 or transparency 400, and compensating for the difference between the known three-dimensional location and a starting location (not shown) on the measurement path 330.

Step 602 of the method 600 includes controlling the first robotic arm 144 and the second robotic arm 164 in a coordinated manner to respectively move the transmitting horn 300 and the receiving horn 310 along the measurement path 330 while maintaining the transmitting horn 300 and the receiving horn 310 in non-contacting proximity to the transparency 400. As mentioned above and shown in FIGS. 11-12, the transmitting horn 300 is coupled to the first robotic arm 144, and the receiving horn 310 is coupled to the second robotic arm 164. The transmitting horn 300 and receiving horn 310 are on the same side of a transparency 400. Control of movement of the first robotic arm 144 and second robotic arm 164 can be effectuated respectively by the first controller 364 and the second controller 366 as described above. During movement along the measurement path 330, the first robotic arm 144 and second robotic arm 164 are configured to maintain the transmitting horn 300 and receiving horn 310 in alignment with each other while maintaining the horn tip 338 of each the transmitting horn 300 and the receiving horn 310 in non-contacting proximity to the transparency surfaces 404.

Step 604 of the method 600 includes emitting, exclusively from the transmitting horn 300, an emitted signal 304 for impingement on the transparency 400 as shown in FIG. 12. As described above, the emitted signal 304 can be described as a focused beam of electromagnetic energy directed outwardly from the horn tip 338 and oriented generally parallel to the transmitting horn axis 302. The transmitting horn 300 can be prompted by the processor 360 (e.g., the spectrum analyzer 370) to emit the emitted signal 304 continuously during movement of the transmitting horn 300 and receiving horn 310 along the measurement path 330. In one example, step 604 of emitting the emitted signal 304 can comprise emitting the emitted signal 304 at least partially in a frequency range of 2-40 GHz. However, in other examples, the emitted signal 304 can have a frequency of less than 2 GHz or a frequency of greater than 40 GHz.

Step 606 of the method 600 includes receiving, exclusively at the receiving horn 310, a received signal 314 comprising at least a portion of the emitted signal 304 after impingement on the transparency 400. As described above, a portion of the emitted signal 304 can be transmitted through the transparency 400, a portion can be absorbed by the transparency 400, and a portion can be reflected off of the transparency surface 404. The received signal 314 can represent the reflected portion and is analyzed by the processor 360 as described below to determine the transparency characteristics (e.g., the transmission coefficients 458) at one or more signal frequencies. Steps 604 and 606 represent the operation of the transmitting horn 300 and receiving horn 310 in a bi-static reflection mode in which the transmitting horn 300 exclusively emits the emitted signal 304 and the receiving horn 310 exclusively receives the received signal 314.

Step 608 of the method 600 includes analyzing, via the processor 360, the received signal 314 to determine at least one transparency characteristic of the transparency 400 at each measurement location 334 along the measurement path 330. For example, step 608 of analyzing the received signal 314 can comprise comparing the received signal 314 to the emitted signal 304 to determine transmission losses in the emitted signal 304 after transmission through, absorption into, and/or reflection off of the transparency 400, as described above. For each measurement location 334, the processor 360 can determine the transmission coefficient 458 for a range of signal frequencies as shown in FIGS. 14-15 and described above. In some examples, step 608 can comprise comparing the received signal 314 to a baseline signal to determine whether the transmission loss at each measurement location 334 meets design requirements for the transparency 400. For examples of the transparency 400 that have at least one coating 410, step 608 of analyzing the received signal 314 can comprise comparing the emitted signal 304 to the received signal 314 and determining the electromagnetic attenuation of the emitted signal 304 during transmission through the coating 410. For example, as mentioned above, step 608 can include accounting for transmission losses due to the transparency 400 alone (e.g., without any coatings) in order to determine the electromagnetic attenuation or transmission loss produced by the coating 410 itself.

The above-described steps 602, 604, 606, and 608 can be continuously performed during inspection of a transparency 400. For example, step 602 can comprise continuously moving the first robotic arm 144 and the second robotic arm 164 along the preprogrammed measurement path 330, step 604 can comprise continuously emitting the emitted signal 304 while moving the first robotic arm 144 along the preprogrammed measurement path 330, step 606 can comprise continuously receiving the received signal 314 while moving the second robotic arm 164 along the preprogrammed measurement path 330, and step 608 can continuously comparing the received signal 314 to the baseline signal and continuously determining the transparency characteristic at a corresponding measurement location 334 on the transparency 400 until the entire transparency 400 has been inspected.

In some examples, the method 600 can include inspecting a transparency 400 with the transmitting horn 300 and receiving horn 310 oriented for different polarizations of the emitted signal 304 and received signal 314. For example, prior to moving the transmitting horn 300 and the receiving horn 310 along the measurement path 330, the method 600 can include controlling the first robotic arm 144 and the second robotic arm 164 in a manner to rotate the transmitting horn 300 and the receiving horn 310 respectively about the transmitting horn axis 302 and the receiving horn axis 312 to change the polarization respectively of the emitted signal 304 and the received signal 314 to horizontal polarization, vertical polarization, or cross-polarization, as described above. Inspecting the transparency 400 at different types of polarization can simulate external electromagnetic radiation to which the transparency 400 can be subjected in its in-service environment.

As described above with regard to FIGS. 11-13, the transmitting horn 300 and the receiving horn 310 are communicatively coupled respectively to the first controller 364 and the second controller 366 by a coaxial cable 374. In order to reduce or avoid signal noise during inspection of the transparency 400, the method 600 can include moving the first robotic arm 144 and the second robotic arm 164 in a manner preventing kinking of the coaxial cable 374 which can otherwise be caused by excessive flexing (e.g., into a small bending radius) of the coaxial cable 374. In this regard, kinking of the coaxial cables 374 can result in phase and amplitude errors in the emitted signal 304 and/or in the received signal 314 and which can skew the measurement accuracy of the transmission losses.

Signal noise can be further reduced or avoided due to the above-described horn-arm connector fitting 340 coupling the transmitting horn 300 to the first robotic arm 144, and coupling the receiving horn 310 to the second robotic arm 164. As mentioned above, each horn-arm connector fitting 340 has a cable slot 346 formed in a side of the horn-arm connector fitting 340 and which allows each coaxial cable 374 to extend outwardly from the bottom end 339 respectively of the transmitting horn 300 and receiving horn 310 toward the exterior respectively of the first robotic arm 144 or second robotic arm 164. The horn-arm connector fitting 340 facilitates movement of the transmitting horn 300 and receiving horn 310 along the measurement path 330 in a manner avoiding undue bending stress on the coaxial cable 374. In this regard, the measurement path 330 itself can also be improved to minimize or prevent bending stress on the coaxial cable 374.

Advantageously, the above-described systems 100 and methods 500, 600 allow for autonomous inspection of a transparency 400 to detect optical defects 210 and assess transmission losses at localized areas of the transparency 400. In addition, the systems 100 and methods 500, 600 allow for continuous inspection of a transparency in a time efficient manner by recording a continuous series of images and/or performing a continuous series of measurements of transmission loss during continuous movement of the inspection device (e.g., imaging device 200 of FIG. 1; transmitting horn 300 and receiving horn 310 of FIG. 11) along a measurement path 330. In addition to allowing for inspection at locally perpendicular orientations, the above-described systems 100 and methods 500, 600 allow for inspection of a transparency 400 with the image device 200 or the horns 300, 310 precisely oriented at specific non-perpendicular angles relative to the transparency surface 404, thereby resulting in a more thorough characterization of the performance properties of the transparency 400 in its intended operating environment.

Further, the disclosure comprises embodiments according to the following clauses:

Clause 1. A system 100, comprising: a robotic arm 124 of a robotic device 120; an imaging device 200 coupled to the robotic arm 124; and a processor 360 configured to control movement of the robotic arm 124 to move the imaging device 200 along a preprogrammed measurement path 330 of a transparency 400 while prompting the imaging device 200 to record images 454 of localized portions of the transparency 400. The processor 360 is configured to determine one or more localized transparency characteristics based on an analysis of the images 454 of the localized portions.

Clause 2. The system 100 of clause 1, wherein the imaging device 200 is configured to continuously generate the images 454 of the localized portions of the transparency 400 during movement of the imaging device 200 along the preprogrammed measurement path 330; and the processor 360 is configured to continuously analyze the images 454 of the localized portions and continuously determine the localized transparency characteristics and corresponding measurement locations on the transparency 400.

Clause 3. The system 100 of any of clauses 1 or 2, wherein the imaging device 200 is a visible-light camera 208 configured to record the images 454 of the transparency 400 in a visible spectrum; and the processor 360 is configured to determine locations of at least one of particulates 212, runs, and sags in the transparency 400 based on analysis of the images 454 of the localized portions.

Clause 4. The system 100 of any of clauses 1 or 2 or 3, wherein: the imaging device 200 is an ultraviolet camera 214 configured to record the images 454 of the transparency 400 in an ultraviolet spectrum; and the processor 360 is configured to determine locations of at least one of cracks and scratches 216 in a transparency surface 404 of the transparency 400 based on analysis of the images 454 of the localized portions.

Clause 5. The system 100 of any of clauses 1 or 2 or 3 or 4, wherein: the imaging device 200 is an SWIR camera 218 configured to detect moisture in the transparency 400; and the processor 360 is configured to determine locations of the moisture in the transparency 400 based on analysis of the images 454 of the localized portions.

Clause 6. The system 100 of any of clauses 1 or 2 or 3 or 4 or 5, further comprising: a light source 230 positionable on at least one of opposing sides of the transparency 400 and configured to illuminate the transparency 400 during the recording of images 454 of the transparency 400.

Clause 7. The system 100 of any of clauses 1 or 2 or 3 or 4 or 5 or 6, wherein: the light source 230 is positionable on a side of the transparency 400 opposite the imaging device 200 and configured to backlight the transparency 400 during the recording of images 454 of the transparency 400 by the imaging device 200.

Clause 8. The system 100 of any of clauses 1 or 2 or 3 or 4 or 5 or 6 or 7, wherein: the light source 230 comprises a plurality of light-emitting elements 232 arranged complementary to a contour of the transparency 400 and configured to illuminate the transparency 400 during the recording of images 454 of the transparency 400.

Clause 9. The system 100 of any of clauses 1 or 2 or 3 or 4 or 5 or 6 or 7 or 8, further comprising: a diffuser 234 positionable between the light source 230 and the transparency 400 and configured to diffuse light emitted by the light source 230 for uniform backlighting of the transparency 400.

Clause 10. A system 100, comprising: a fixture configured to support a transparency 400; a robotic arm 124 of a robotic device 120 mounted to the fixture, the robotic arm 124 configured to be coupled to an imaging device 200; and a processor 360 configured to control movement of the robotic arm 124 to move the imaging device 200 along a preprogrammed measurement path 330 of the transparency 400 while prompting the imaging device 200 to record images 454 of localized portions of the transparency 400. The processor 360 is configured to determine one or more localized transparency characteristics based on an analysis of the images 454 of the localized portions.

Clause 11. A method, comprising: moving a first robotic arm 144 and a second robotic arm 164 in a coordinated manner to move a transmitting horn 300 and a receiving horn 310 along a preprogrammed measurement path 330 on a same side of a transparency 400 while maintaining the transmitting horn 300 and the receiving horn 310 in non-contacting proximity to the transparency 400, the transmitting horn 300 coupled to the first robotic arm 144, the receiving horn 310 coupled to the second robotic arm 164; emitting, exclusively from the transmitting horn 300, an emitted signal 304 for impingement on the transparency 400; receiving, exclusively at the receiving horn 310, a received signal 314 comprising at least a portion of the emitted signal 304 after impingement on the transparency 400; and analyzing, via a processor 360, the received signal 314 and determining at least one transparency characteristic.

Clause 12. The method of clause 11, wherein the step of analyzing the received signal 314 comprises: determining changes in the emitted signal 304 after impingement on the transparency 400 to determine the at least one transparency characteristic.

Clause 13. The method of any of clauses 11 or 12, wherein the step of analyzing the received signal 314 comprises: comparing the received signal 314 to a baseline signal to determine the at least one transparency characteristic.

Clause 14. The method of any of clauses 11 or 12 or 13, wherein the steps of moving the robotic arms 144, 164, emitting the emitted signal 304, receiving the received signal 314, and analyzing the received signal 314 respectively comprise: continuously moving the first robotic arm 144 and the second robotic arm 164 along the preprogrammed measurement path 330; continuously emitting the emitted signal 304 while moving the first robotic arm 144 along the preprogrammed measurement path 330; continuously receiving the received signal 314 while moving the second robotic arm 164 along the preprogrammed measurement path 330; and continuously analyzing the received signal 314 and continuously determining the at least one transparency characteristic.

Clause 15. The method of any of clauses 11 or 12 or 13 or 14, further comprising: moving the first robotic arm 144 and the second robotic arm 164 in a manner to rotate the transmitting horn 300 and the receiving horn 310 respectively about a transmitting horn axis 302 and a receiving horn axis 312 to change a polarization respectively of the emitted signal 304 and the received signal 314 to at least one of horizontal polarization, vertical polarization, or cross-polarization.

Clause 16. The method of any of clauses 11 or 12 or 13 or 14 or 15, wherein emitting the emitted signal 304 comprises: emitting the emitted signal 304 at least partially in a radio spectrum comprising a frequency range of 2-40 GHz.

Clause 17. The method of any of clauses 11 or 12 or 13 or 14 or 15 or 16, wherein the transparency 400 comprises a coating 410, the step of analyzing the received signal 314 comprises: comparing the emitted signal 304 to the received signal 314 and determining an electromagnetic attenuation of the emitted signal 304 during impingement on the coating 410.

Clause 18. The method of any of clauses 11 or 12 or 13 or 14 or 15 or 16 or 17, wherein the transmitting horn 300 and the receiving horn 310 are communicatively coupled respectively to a first controller 364 and a second controller 366 by a coaxial cable 374, the method further comprising: moving the first robotic arm 144 and the second robotic arm 164 in a manner preventing kinking of the coaxial cable 374 to thereby reduce signal noise.

Clause 19. The method of any of clauses 11 or 12 or 13 or 14 or 15 or 16 or 17 or 18, wherein: the transmitting horn 300 and the receiving horn 310 are each coupled respectively to the first robotic arm 144 and the second robotic arm 164 by a horn-arm connector fitting 340; and the horn-arm connector fitting 340 having a cable slot 346 formed in a side of the horn-arm connector fitting 340 and allowing a coaxial cable 374 to pass out of a bottom end 339 of each of the transmitting horn 300 and the receiving horn 310.

Clause 20. The method of any of clauses 11 or 12 or 13 or 14 or 15 or 16 or 17 or 18 or 19, wherein: the transparency 400 is one of an aircraft windshield 412, an aircraft canopy, or an aircraft passenger window.

To the extent that terms "includes," "including," "has," "contains," and variants thereof are used herein, such terms are intended to be inclusive in a manner similar to the term "comprises" as an open transition word without precluding any additional or other elements.

Additional modifications and improvements of the present disclosure can be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A system, comprising:
a robotic arm of a robotic device;
an imaging device coupled to the robotic arm and configured to record images of a complexly-curved transparency;
an imaging background positionable on a side of the complexly-curved transparency opposite the imaging device and contoured complementary to a contour of the complexly-curved transparency, and the imaging background is uniformly dark colored;
a light source mountable on the imaging device and configured to homogenously frontlight the complexly-curved transparency; and
a processor configured to control movement of the robotic arm to move the imaging device along a preprogrammed measurement path of the complexly-curved transparency while continuously maintaining the imaging device at a specific locally non-perpendicular angle relative to a transparency surface of the complexly-curved transparency to thereby simulate a specific locally non-perpendicular angle at which radiation impinges on the transparency in its in-service environment, while prompting the imaging device to record images of localized portions of the complexly-curved transparency,
the processor configured to determine one or more light-colored defects based on an analysis of the images of the localized portions.

2. The system of claim 1, wherein:
the imaging device is configured to continuously generate the images of the localized portions of the transparency during movement of the imaging device along the preprogrammed measurement path; and
the processor configured to continuously analyze the images of the localized portions and continuously determine the light-colored defects and corresponding measurement locations on the transparency.

3. The system of claim 1, wherein:
the imaging device is a visible-light camera configured to record the images of the transparency in a visible spectrum; and
the processor configured to determine locations of at least one of particulates, runs, and sags in the transparency based on analysis of the images of the localized portions.

4. The system of claim 1, wherein:
the preprogrammed measurement path comprises the path of movement of a point at the intersection of an imaging device axis of the imaging device, with a transparency surface of the transparency.

5. The system of claim 1, wherein:
the preprogrammed measurement path comprises a plurality of path sections oriented generally parallel to each other, and connected end-to-end to define a serpentine path along which the imaging device is moved by the robotic arm.

6. The system of claim 5, wherein:
the path sections are spaced apart from each other by a spacing distance that is no greater than the width of a field of view of the imaging device.

7. The system of claim 5, wherein:
the path sections are oriented parallel to a lengthwise direction of the transparency.

8. The system of claim 1, wherein:
the processor is configured to control the robotic arm in a manner maintaining the imaging device in non-contacting proximity to the transparency while moving the imaging device along the preprogrammed measurement path.

9. The system of claim 1, wherein:
the processor is configured to compare each image of the localized portions of the transparency to a baseline image of a transparency known to be free of optical defects.

10. The system of claim 1, wherein:
the processor is configured to prompt the imaging device to sequentially record images of the localized portions of the transparency during movement of the imaging device along the preprogrammed measurement path.

11. The system of claim 1, wherein:
the processor is configured to prompt the imaging device to record a sequence of static images of the transparency during movement of the imaging device along the preprogrammed measurement path, each static image covering one of the localized portions of the transparency.

12. The system of claim 1, wherein:
the robotic arm comprises two or more arm sections connected by arm joints.

13. The system of claim 1, wherein:
the imaging background is positioned in non-contacting proximity to the transparency.

14. The system of claim 1, wherein:
the imaging background is configured such that at any point along the preprogrammed measurement path, the images of the localized portions of the transparency are backed entirely by the imaging background.

15. The system of claim 1, wherein:
the imaging background is formed of a sheet of material.

16. The system of claim 15, wherein:
the sheet of material is one of a metallic sheet or a polymeric sheet.

17. The system of claim 15, wherein:
the sheet of material is uniform in color.

18. A system, comprising:
a robotic arm of a robotic device, the robotic arm configured to be coupled to an imaging device;

an imaging background positionable on a side of a complexly-curved aircraft windshield or canopy opposite the imaging device and contoured complementary to a contour of the complexly-curved aircraft windshield or canopy, and the imaging background is uniformly dark colored;

a light source mountable on the imaging device and configured to homogenously frontlight the complexly-curved aircraft windshield or canopy; and a processor configured to control movement of the robotic arm to move the imaging device along a preprogrammed measurement path of the complexly-curved aircraft windshield or canopy, while continuously maintaining the imaging device at a specific locally non-perpendicular angle relative to a transparency surface of the complexly-curved aircraft windshield or canopy to thereby simulate a specific locally non-perpendicular angle at which radiation impinges on the aircraft windshield or canopy in its in-service environment, while prompting the imaging device to record images of localized portions of the complexly-curved aircraft windshield or canopy, the processor configured to determine one or more light-colored defects of the complexly-curved aircraft windshield or canopy based on an analysis of the images of the localized portions.

19. The system of claim 18, wherein:

the robotic arm comprises two or more arm sections connected by arm joints.

20. The system of claim 18, wherein:

the imaging device is configured to continuously generate the images of the localized portions of the complexly-curved aircraft windshield or canopy during movement of the imaging device along the preprogrammed measurement path; and the processor is configured to continuously analyze the images of the localized portions and continuously determine the light-colored defects and corresponding measurement locations on the complexly-curved aircraft windshield or canopy.

* * * * *